US009503728B2

(12) United States Patent
Mochizuki et al.

(10) Patent No.: US 9,503,728 B2
(45) Date of Patent: Nov. 22, 2016

(54) IMAGE PROCESSING DEVICE, DECODING METHOD, INTRA-FRAME DECODER, METHOD OF DECODING INTRA-FRAME AND INTRA-FRAME ENCODER

(75) Inventors: Seiji Mochizuki, Kanagawa (JP); Yutaka Funabashi, Kanagawa (JP); (Continued)

(73) Assignee: Renesas Electronics Corporation, Tokyo (JP)

( * ) Notice: Subject to any disclaimer, the term of this patent is extended or adjusted under 35 U.S.C. 154(b) by 666 days.

(21) Appl. No.: 13/144,546

(22) PCT Filed: Jan. 15, 2009

(86) PCT No.: PCT/JP2009/000122
§ 371 (c)(1),
(2), (4) Date: Jul. 14, 2011

(87) PCT Pub. No.: WO2010/082231
PCT Pub. Date: Jul. 22, 2010

(65) Prior Publication Data
US 2011/0280305 A1  Nov. 17, 2011

(51) Int. Cl.
*H04N 7/32* (2006.01)
*H04N 19/11* (2014.01)
(Continued)

(52) U.S. Cl.
CPC .............. *H04N 19/11* (2014.11); *H04N 19/44* (2014.11); *H04N 19/593* (2014.11); *H04N 19/61* (2014.11); *H04N 19/583* (2014.11)

(58) Field of Classification Search
CPC .................... H04N 19/11; H04N 19/44; H04N 19/583; H04N 19/593; H04N 19/61
See application file for complete search history.

(56) References Cited

U.S. PATENT DOCUMENTS 5,428,396 A * 6/1995 Yagasaki et al. ......... 375/240.16
2003/0202588 A1* 10/2003 Yu et al. ................... 375/240.12
(Continued)

FOREIGN PATENT DOCUMENTS

| JP | 6-351001 A | 12/1994 |
| JP | 2006-311603 A | 11/2006 |
| TW | 2008-45765 A | 11/2008 |
| WO | WO 2007/093629 A1 | 8/2007 |
| WO | WO 2009/089032 A2 | 7/2009 |

OTHER PUBLICATIONS

Extended texture prediction for H.264/AVC intra coding, 31. VCEG Meeting; 79. MPEG Meeting; Jan. 15-16, 2007;Marrakech; (Video Coding Experts Group of I-I-U-T SG.16),, No. VCEG-AE11, Jan. 14, 2007, XP030003514, ISSN: 0000-0157.*

(Continued)

Primary Examiner — Mohammed Rahaman
(74) Attorney, Agent, or Firm — Shapiro, Gabor and Rosenberger, PLLC

(57) ABSTRACT

Adopted is a decoder, in which on condition that a prediction block shown by vector information extracted from a data stream, and a decode-target block have an overlap where respective pixels overlay each other, pixel information of an already-decoded portion at a distance of an integer multiple of a vector provided by the vector information from the overlap is made a prediction signal instead of the overlap, and the prediction signal is added to difference image data taken from the data stream to generate reproduction image data. The decoder is adopted for an intra-frame decoder, a local decoder of an encoder, and the like. According to a fundamental rule concerning a repetitive pattern of an image, a pixel at a distance of an integer multiple is a like pixel, and therefore the process of decoding can be performed efficiently.

13 Claims, 17 Drawing Sheets

(75) Inventors: Junichi Kimura, Koganei (JP);
Masakazu Ehama, Sagamihara (JP)

(51) Int. Cl.
*H04N 19/61* (2014.01)
*H04N 19/593* (2014.01)
*H04N 19/44* (2014.01)
*H04N 19/583* (2014.01)

(56) References Cited

U.S. PATENT DOCUMENTS

| 2007/0217516 | A1* | 9/2007 | Zhang | 375/240.17 |
| 2009/0003443 | A1* | 1/2009 | Guo et al. | 375/240.13 |
| 2010/0091846 | A1  | 4/2010 | Suzuki et al. | |
| 2010/0111183 | A1* | 5/2010 | Jeon et al. | 375/240.16 |
| 2010/0232505 | A1* | 9/2010 | Thoreau et al. | 375/240.16 |
| 2011/0007800 | A1* | 1/2011 | Zheng et al. | 375/240.12 |

OTHER PUBLICATIONS

Balle J. et al., "Extended texture prediction for H.264/AVC intra coding", 31. VCEG Meeting; 79. MPEG Meeting, Jan. 15-16, 2007; Marrakech; (Video Coding Experts Group of ITU-T SG.16), No. VCEG-AE11, Jan. 14, 2007, XP030003514, ISSN: 0000-0157.
Thiow Keng Tan et al., "Intra Prediction by Averaged Template Matching Predictors", Consumer Communications and Networking Conference, 2007. CCNC Jul. 20, 2007 4th IEEE, IEEE, Pl, Jan. 1, 2007, pp. 405-409, XP 031087817, ISBN: 978-1-4244-0667-8.
Extended European Search Report dated Sep. 18, 2013, in European Patent Application No. 09838201.3.
ITU-T H.264, Series H: Audiovisual and Multimedia Systems Infrastructure of audiovisual services—Coding of moving video, Advanced video coding for generic audiovisual services , Nov. 2007.
ISO/IEC 14496-10, Information technology—Coding of audio-visual objects—Part 10: Advanced Video Coding , Oct. 1, 2004.
Office Action issued Aug. 20, 2014, in Chinese Patent Application No. CN200980154636.9.
Office Action issued Apr. 9, 2014, in Chinese Patent Application No. CN200980154636.9.
Office Action issued Mar. 18, 2015, in Korean Patent Application No. 10-2011-7016414.
Office Action issued Mar. 15, 2016, in Korean Patent Application No. 10-2016-7001770.

* cited by examiner

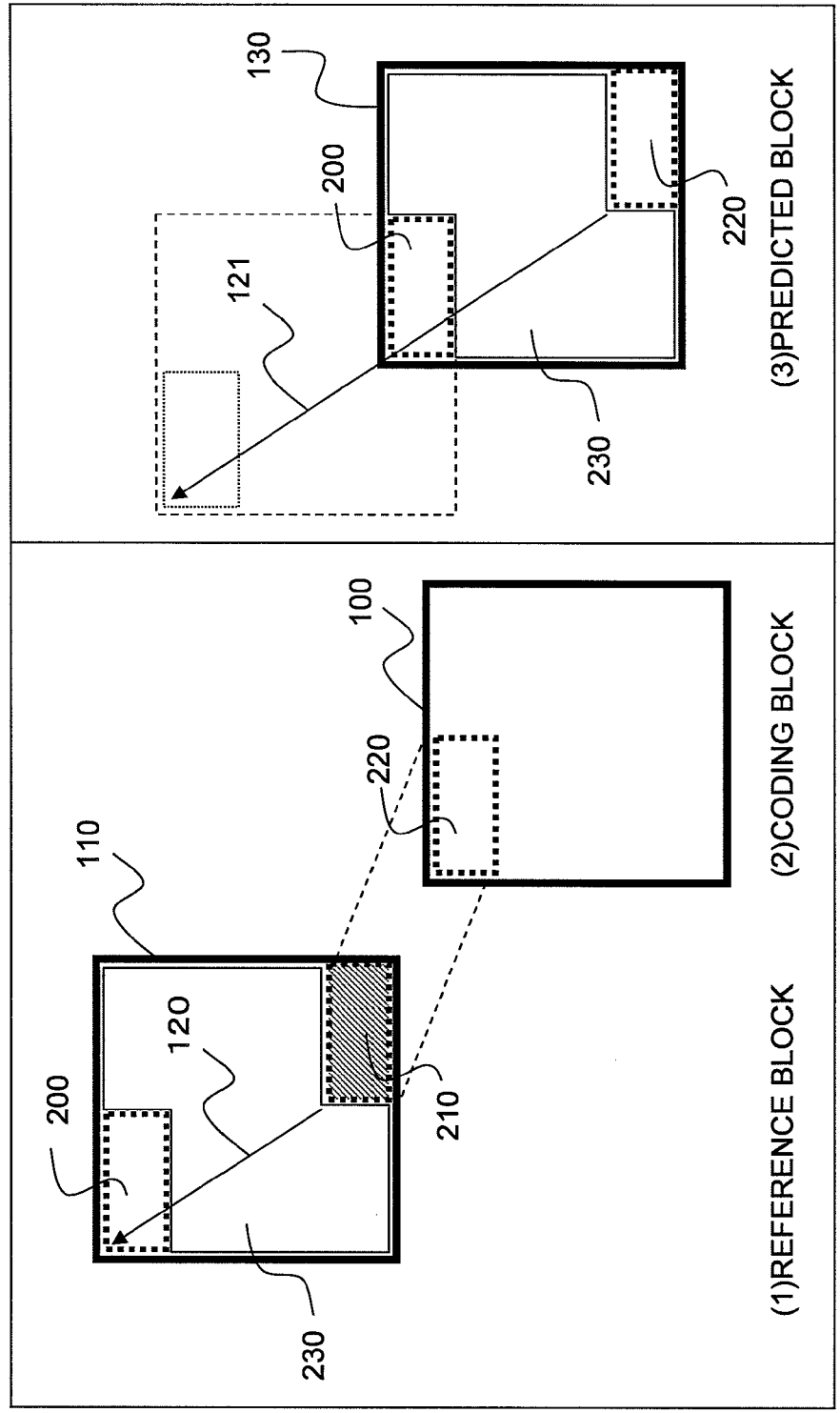

| 1 | 2 | 3 | 4 |
|---|---|---|---|
| 5 | 6 | 7 | 8 |
| 9 | 10 | 11 | 12 |
| 13 | 14 | 15 | 16 |

(1)

| 1 | 2 | 5 | 6 |
|---|---|---|---|
| 3 | 4 | 7 | 8 |
| 9 | 10 | 13 | 14 |
| 11 | 12 | 15 | 16 |

| 1310X | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
|---|---|---|---|---|---|---|---|---|---|---|---|---|---|---|---|---|---|---|---|---|---|---|---|---|---|
| Y | 0 | | | | | 1 | | | | | 2 | | | | | 3 | | | | | 4 | | | | |

1060: a b c d e f g h i j k l m

3021: q r s u w z

3040: A' B' F' G' K' L'

3060: a b c d e f g h i j k l m A' B' q r s F' G'

3070: a b c d e f g h i j k l m A' B' q r s F' G'

3090: f g h i j k l m A' B' q r s F' G' u w z K' L'

1080: f g h i j k l m A' B' q r s F' G' u w z K' L'

1080: A' B' C' D' F' G' H' I' K' L' M' P' Q' R' S' T'

3100, 3110, 3120

IMAGE PROCESSING DEVICE, DECODING METHOD, INTRA-FRAME DECODER, METHOD OF DECODING INTRA-FRAME AND INTRA-FRAME ENCODER

TECHNICAL FIELD

The present invention relates to coding and decoding techniques for an intra-frame decoder operable to perform intra-frame decoding of a moving picture or still picture, and further an intra-frame encoder in which the decoding method adopted for the intra-frame decoder is applied to intra-frame predictive coding.

BACKGROUND ART

Conventionally, the coding systems typified by MPEG-2 and MPEG-4 standardized by MPEG (Moving Picture Experts Group), and H.264 standard (the document of which is the same as MPEG-4 Part 10) standardized by ITU-T (International Telecommunication Union, Telecommunication Standardization Sector) have been known as the art in the area of moving picture coding.

The moving picture coding is broadly classified into inter-frame coding and intra-frame coding. In inter-frame coding, a difference between temporally successive images is coded, whereas in intra-frame coding an image is coded separately. (One picture which a moving picture includes is hereinafter referred to as "image". "Image" can represent any of "frame" and "field" according to progressive signals and interlace signals. For instance, "image" represents "frame" when coding is executed in frames, however in the case of processing in fields, "image" refers to "field". Now, it is noted that "inter-frame", "inter-frame" and "frame memory", which have been generic terms in the coding area, are used as they are, however they are not limited to "frame" of interlace signals, and they can mean any of "frame" and "field" depending on a processing mode at that time.) In general, the amount of codes of an image subjected to intra-frame coding is larger than that of an image subjected to inter-frame coding. Despite such being the case, intra-frame coding is a scheme necessary for improvement of the random accessibility at the time of reproduction and for return at occurrence of an error as well as the top of video contents (of a sequence), and typically intra-frame coding is periodically selected at intervals of 0.5 to 2 seconds, i.e. 15 to 60 frames.

In the coding, an image is splintered into blocks, and the block makes a unit of the processing. (Usually, a block is composed of 16 pixels×16 lines, which is referred to as "macro block" in MPEG. The "block" is hereinafter used as a generic term of the processing unit, which processing involved with the invention is performed in. If the unit of processing involved with the invention is different from the size of a macro block in MPEG, the block defined as described above is sometimes referred to as "sub-block" to clearly discriminate it from a macro block.) In intra-frame coding, the coding is performed following the procedure. A prediction signal is produced, for each block, using the value of an already-coded image signal (pixel) within the same image, and then a value of the difference between a signal of a block to be coded, and the prediction signal is subjected to orthogonal transformation and quantization, and thus translated into a code. In parallel, an identification signal which the prediction signal is produced based on is coded as well.

Non-patent documents 1 and 2, which are to be cited later, show nine methods, i.e. eight methods which FIG. 1 shows as a method of producing a prediction signal and a method of using a mean value of pixels surrounding a block to be coded. As to the methods shown by FIG. 1, eight-direction prediction methods depending on the image contents' direction are defined involving a prediction signal of a coding block 200—yet to be coded. The part (1) of FIG. 1, for example, shows a method suitable for a case in which the contents of the image have a strong correlation with each other along the lengthwise direction, i.e. follow the lengthwise line. According to the method, an already-coded signal 211 neighboring a coding block 200 is repeatedly copied along the direction of a copy direction 212, whereby a prediction signal is produced. Now, it is noted that an area involved with the pixel signal 211 used for prediction has a one-pixel width in the lengthwise direction, and a crosswise width corresponding to a number of pixels—the same as the number of pixels of the block in the crosswise direction. Likewise, with parts (2) to (8) of FIG. 1, prediction signals are produced by copying the values of pixel signals in directions indicated by arrows from already-coded signals (respective hatched portions). As to any of the parts (2) to (8) of FIG. 1, an area involved with a signal of pixel used for prediction (shown by a hatched portion) has a one-pixel width, belongs to the areas of already-coded pixel signals, and neighbors a not-yet-coded area (a pixel belonging to not-yet-decoded areas is present somewhere in eight vicinities of a pixel concerned). In line with the steps of coding, an identification signal showing the direction adopted in the prediction is coded.

Patent Documents 1 and 2, which are to be cited later, disclose a method of indicating a position on which to produce a prediction signal by use of a vector as a prediction method. (A piece of information indicating a pixel position in a picture is hereinafter referred to as "a vector" simply, or "a prediction vector" except as otherwise provided. If the information must be distinguished from "a motion vector" used for so-called motion-compensated inter-frame coding, the information is referred to as "intra-picture vector".) In FIG. 2, one image consists of an already-coded area 130 and a not-yet-coded area 140. When coding a coding block 100, a block signal (prediction block 110) suitable for using as a prediction signal is selected from an already-coded area 130, and its position is indicated as a two-dimensional relative position with respect to the coding block 100 (by a prediction vector 120). In the drawing, the vector 120 is represented by the relative position of a pixel located in an upper-left portion of the block (shown as a small quadrangular shape). In the coding, the difference between each pixel signal from inside the coding block 100 and a pixel signal from inside the corresponding prediction bock 120 is taken, the signal of the difference is subjected to orthogonal transformation and quantization, and then the resultant difference signal and the prediction vector are coded. The process of decoding is similar to the process of coding. A reproduction image may be formed by setting the not-yet-coded area 140 as a not-yet-decoded area, the coding block 100 as a decoding block targeted for decoding, and the already-coded area 130 as an already-decoded area, and adding the information of the difference to a prediction signal taken from the already-decoded area according to the vector information.

Patent Documents 1 and 2 discloses a prediction method in a condition in which a prediction block 110 overlaps with a coding block 100 as shown in FIG. 3. In this case, the lower right portion (overlap 200) of the prediction block 110 has not been subjected to coding, and therefore there is no data making a prediction signal. Cited as signals from the overlap 200 in Patent Document 1 are: a signal of a fixed value (e.g. a signal value for expressing gray); a signal of a mean value of pixel values from surrounding pixels 210; and a signal with a signal value predicted from the surrounding pixels 210 (e.g. the method of the part (2) of FIG. 1). Therein, the surrounding pixels 210 belong to the already-coded area 130, and neighbor the overlap 200 (a pixel belonging to pixels of the overlap is present somewhere in eight vicinities of a pixel concerned). In the case of decoding in the condition as shown by FIG. 3, the overlap 200 where the prediction block 110 of the already-decoded area 130 overlaps with the coding block 100 targeted for decoding in the not-yet-decoded area 140 has not been subjected to decoding, and therefore there is no data making a prediction signal.

Non-patent Document 1: ITU-T H.264, SERIES H: AUDIOVISUAL AND MULTIMEDIA SYSTEMS Infrastructure of audiovisual services—Coding of moving video, Advanced video coding for generic audiovisual services;

Non-patent Document 2: ISO/IEC 14496-10, Information technology—Coding of audio-visual objects—Part 10: Advanced Video Coding (the content of which is the same as that of Non-patent Document 1);

Patent document 1: US patent application No. 2003/0202588; and

Patent document 2: the Japanese published unexamined patent application No. JP-A-6-351001.

DISCLOSURE OF THE INVENTION

Problems that the Invention is to Solve

The prediction methods described in Non-patent documents 1 and 2 have the following features: there is continuity between an image of an already-coded area (an already-decoded area) and an image in a coding block (e.g. a straight line or edge image connecting between an image of an already-coded area (an already-decoded area), and the inside of a coding block); and the efficiency of prediction becomes higher on condition that the direction thereof coincides with the eight directions as shown in FIG. 1. In contrast, in the case of e.g. a discontinuous image such as a periodic discrete pattern or the case of the disparity of the direction of the continuity with the eight directions of FIG. 1, the prediction methods involve the problem that the efficiency of coding (compression rate) does not become higher.

However, with the method as disclosed by the Patent Document 1, an image including a periodic pattern can be handled, and the direction thereof can be specified finely. However, the method has the following problem. That is, the efficiency of coding (compression rate) does not become higher on condition that the coding block 100 overlaps with the prediction block 110 as shown in FIG. 3. This is because the way to process the overlap is the same as that adopted for the methods of Non-patent documents 1 and 2. In general, the smaller the distance between pixels is, the larger the correlation of the image signals is, and the probability of presence of the most appropriate prediction block 110 in the vicinity of the coding block 100 is large. The method according to Patent Document 1, and a method based a combination of the method of Patent Document 1 and the method according to Non-patent documents 1 and 2 have the problem that the smaller the size of the prediction vector 120 is, the wider the overlapping area 200 for which the prediction fails to come true is.

It is an object of the invention to provide a technique for image coding and decoding, by which the efficiency of prediction never lowers even in the case of using a prediction vector to produce a prediction signal from a vicinity of a coding block.

More specifically, it is an object to provide a technique for image coding and decoding, which can increase the efficiency of prediction on a portion where a prediction block and a coding block overlap with each other, and contribute to the improvement of image quality.

The above and other objects of the invention, and the novel features thereof will become apparent from the description hereof and the accompanying drawings.

Means for Solving the Problems

Now, of the embodiments of the invention herein disclosed, a representative embodiment will be briefly described below.

According to the representative embodiment, a decoder is adopted. In the decoder, on condition that a prediction block shown by vector information extracted from a data stream, and a decode-target block have an overlap where respective pixels overlay each other, pixel information of an already-decoded portion at a distance of an integer multiple of a vector provided by the vector information from the overlap is made a prediction signal instead of the overlap; and the prediction signal is added to difference image data taken from the data stream, whereby reproduction image data are created. The decoder can be adopted for an intra-frame decoder, a local decoder of an coding device, and the like. This means is devised directing attention to the idea that a pixel at a distance of an integer multiple is a like pixel based on a fundamental rule concerning a repetitive pattern of an image.

Effects of The Invention

The effects achieved by the representative embodiment of the invention herein disclosed will be briefly described below.

The efficiency of prediction in intra-frame coding can be increased, and thus the data amount of difference signals (e.g. the power of prediction error) can be reduced, and the amount of codes of an image of interest can be decreased. In general, intra-frame coding involves a larger amount of codes in comparison to inter-frame coding. Therefore, the amount of codes can be reduced concerning video streams totally. The representative embodiment of the invention involves the effect that the amount of codes required to attain a given image quantity is reduced, or the effect that a high-definition video image can be reproduced with a given amount of codes.

BRIEF DESCRIPTION OF THE DRAWINGS

FIG. 4 is a diagram showing the way to process an overlap of a coding block and a prediction block according to the invention.

FIG. 18 is a timing chart of the processing of FIG. 17.

EXPLANATION OF REFERENCE NUMERALS

Figure 1:
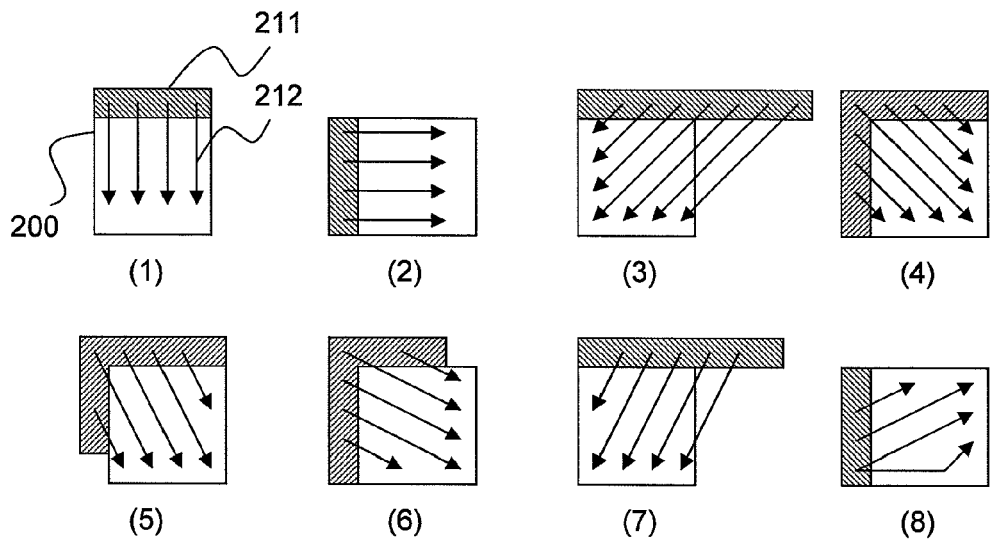
FIG. 1 is a diagram showing a conventional intra-frame prediction.

100 CODING BLOCK
110 PREDICTION BLOCK
120 PREDICTION VECTOR
130 ALREADY-DECODED AREA
140 NOT-YET-DECODED AREA
200 OVERLAPPING AREA
1001 IMAGE DECODER
1010 INPUT DATA STREAM
1020 DECODE CIRCUIT
1030 PREDICTION VECTOR
1040 PREDICTION SIGNAL GENERATOR CIRCUIT
1080 PREDICTION SIGNAL
1200 VECTOR MULTIPLIER CIRCUIT
1250 CONTROL CIRCUIT
1460 BLOCK MEMORY
3000 HALF-PEL PROCESSING CIRCUIT

BEST MODE FOR CARRYING OUT THE INVENTION

1. Summary of the Embodiments

First, the representative embodiment of the invention herein disclosed will be outlined. Here, the reference numerals, characters or signs for reference to the drawings, which are accompanied with paired round brackets, only show as examples what the concepts of members or components referred to by the numerals, characters or signs contain.

[1] An image processing device (FIGS. 7, 8 and 9) according to the representative embodiment of the invention has a decoder. On condition that a prediction block shown by vector information extracted from a data stream, and a decode-target block have an overlap where respective pixels overlay each other, the decoder makes pixel information of an already-decoded portion at a distance of an integer multiple of a distance provided by the vector information from the overlap a prediction signal instead of the overlap, and adds the prediction signal to difference image data taken from the data stream to generate reproduction image data.

According to the above, on condition that a prediction block and a decode-target block have an overlap where respective pixels overlay each other, pixel information of an already-decoded portion is used as a prediction signal, instead of the overlap which has not been decoded, and therefore the increase of the efficiency of prediction, the reduction of the amount of codes, and the enhancement of image quality are enabled. An integer multiple of a distance indicated by the vector based on vector information is determined, and then pixel information of an already-decoded portion is acquired. Therefore, the image processing device can be controlled readily. The embodiment can be applied to not only decoding, but also a local decode of coding readily.

[2] A decoding method (FIG. 10) according to the representative embodiment of the invention, on condition that a prediction block shown by vector information extracted from a data stream, and a decode-target block have an overlap where respective pixels overlay each other, includes: the step of making pixel information of an already-decoded portion at a distance of an integer multiple of a distance provided by the vector information from the overlap a prediction signal instead of the overlap; and the step of adding the prediction signal to difference image data taken from the data stream to generate reproduction image data.

[3] An intra-frame decoder (FIGS. 7, 8 and 9) according to another embodiment of the invention includes: an extracting module (1020) operable to extract vector information showing a prediction block from data stream (1010); a judging module (1250) operable to judge which of an already-decoded area and a not-yet-decoded area respective pixel data shown by the vector information are involved in; a pixel-position-calculating module (1300, 1320, 1400, 1420) operable to calculate a pixel position at a distance of an integer multiple of a size provided by the vector information from the pixel data judged to be involved in the not-yet-decoded area, and in the already-decoded area; a prediction-signal-generating module (1450, 1460) operable to generate prediction image data for pixel data shown by the vector information, based on pixel data of a pixel position calculated by the pixel-position-calculating module, and the pixel data judged to be involved in the already-decoded area; and an image-reproducing module operable to add difference image data taken from the data stream to the prediction image data, thereby to create reproduction image data.

[4] The intra-frame decoder of Item 3 further includes a multiplier module (1200) operable to multiply, by an integer, a vector provided by the vector information. The pixel-position-calculating module uses a vector resulting from the multiplication to calculate a pixel position of pixel data of an already-decoded area.

Figure 17:
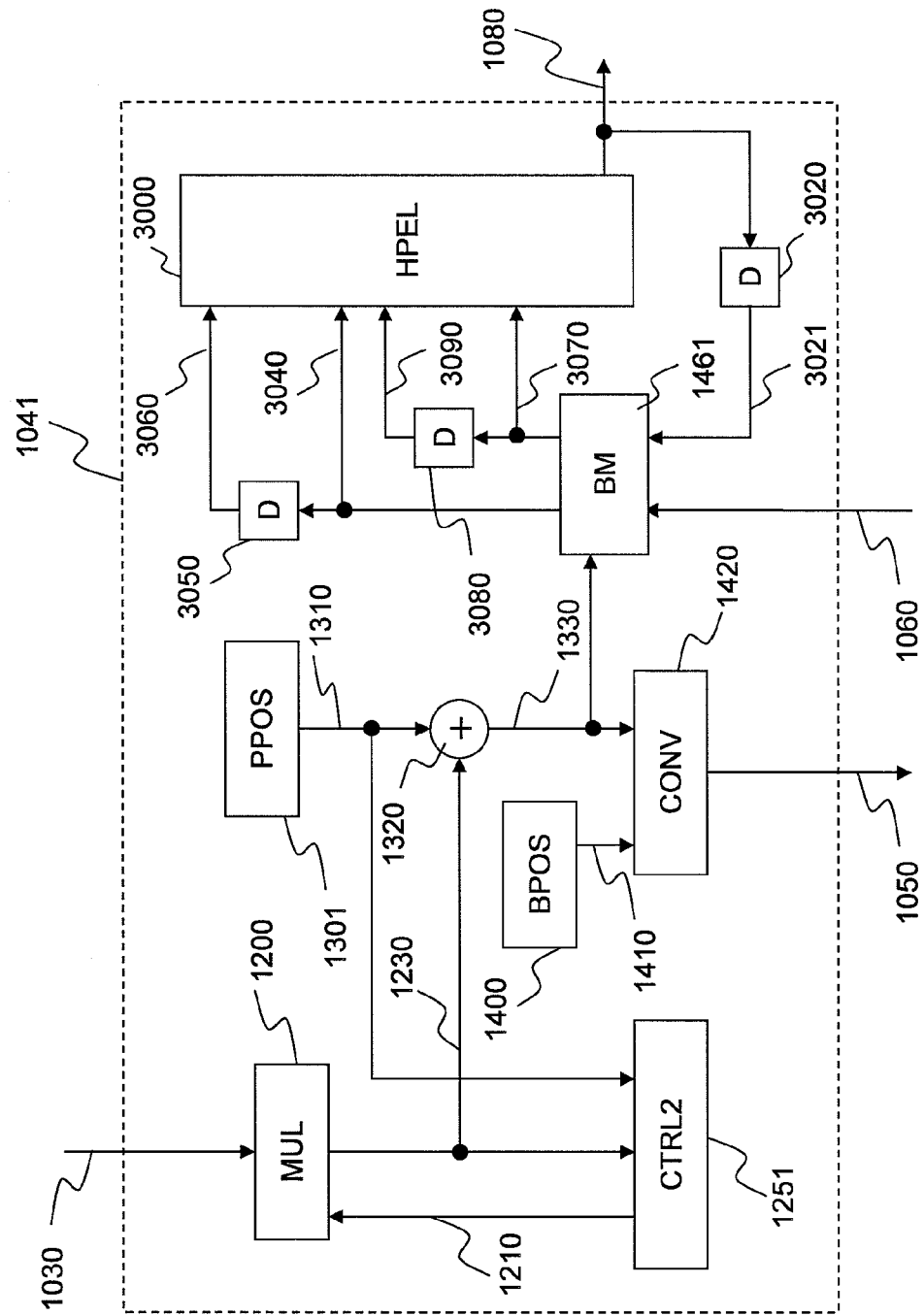
FIG. 17 is a block diagram showing the configuration of a prediction signal generator circuit to realize the processing of FIG. 16.

[5] In the intra-frame decoder of Item 3, the prediction-signal-generating module (1461, 3000) performs an operation of pixel data for interpolation between pixels on pixel data of the calculated pixel position, and of pixel data shown by the vector information, pixel data of the already-decoded area, thereby to create prediction image data (FIG. 17, Half-pel).

Figure 14:
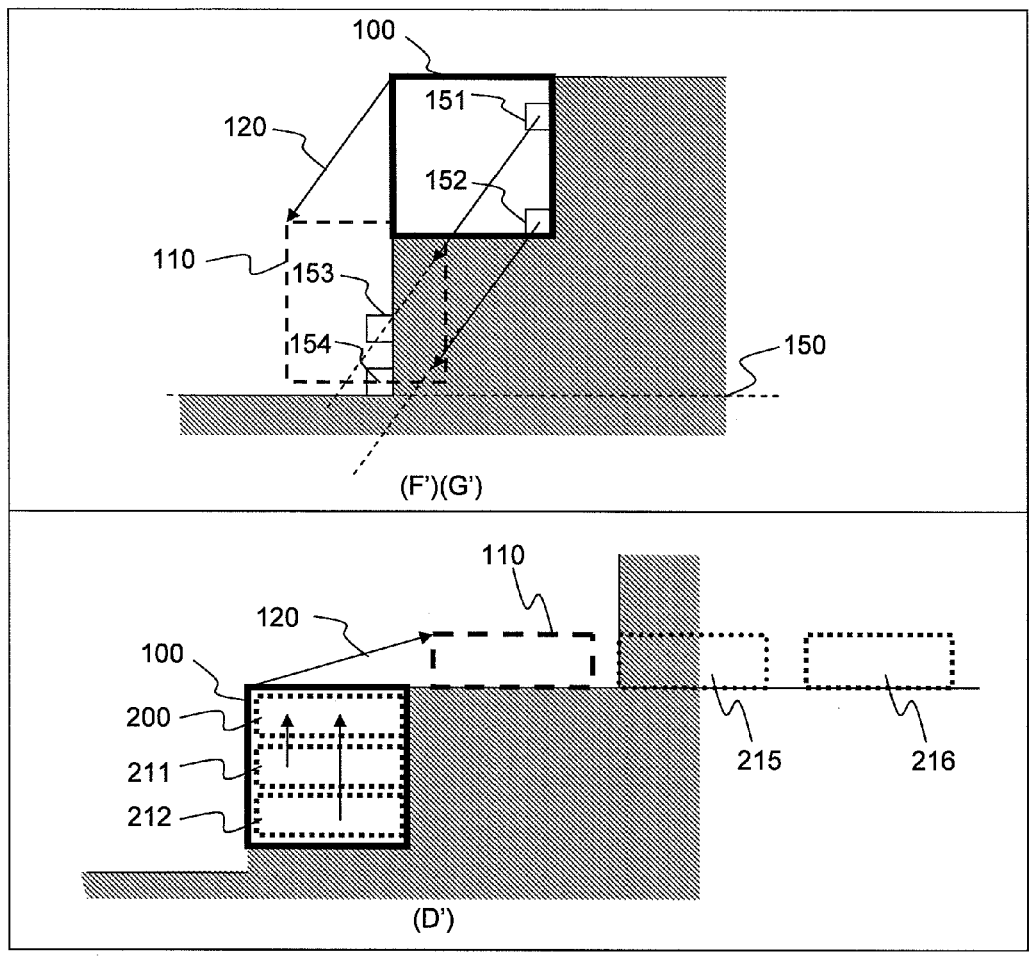
FIG. 14 is a diagram showing the step of producing prediction signals concerning areas (F'), (G') and (D') in FIG. 13.

[6] In the intra-frame decoder of Item 3, the pixel-position-calculating module calculates a pixel position within a given range (FIG. 14, the restriction of access range).

[7] In the intra-frame decoder of Item 6, the given range is set based on a signal extracted from the data stream. (Setting of an Access Range with a Data Stream)

[8] In the intra-frame decoder of Item 3, the data stream is a data stream of a still or moving picture.

[9] A decoding method (FIG. 10) according to another embodiment of the invention includes: an extracting step of extracting vector information showing a prediction block from a data stream; a judging step of judging which of an already-decoded area and a not-yet-decoded area respective pixel data shown by the vector information are involved in; a pixel-position-calculating step of calculating a pixel position at a distance of an integer multiple of a size provided by the vector information from the pixel data judged to be involved in the not-yet-decoded area, and in the already-decoded area; a prediction-signal-generating step of generating prediction image data for pixel data shown by the vector information, based on pixel data of the pixel position calculated by the pixel-position-calculating step, and the pixel data judged to be involved in the already-decoded area; and an image-reproducing step of adding difference image data taken from the data stream to the prediction image data, thereby to create reproduction image data.

[10] A decoding method (10) includes, more concretely: a first step of extracting vector information showing a prediction block from a data stream; a second step of judging which of an already-decoded area and a not-yet-decoded area respective pixel data shown by the vector information are involved in; a third step of computing an integer multiple of a vector provided by the vector information; a fourth step of calculating a pixel position at a distance of the integer multiple of the vector from the pixel data judged to be involved in the not-yet-decoded area, and in the already-decoded area; a fifth step of creating prediction image data based on pixel data of the pixel position calculated by the fourth step, and pixel data included in the area judged in the second step to have been decoded; and a sixth step of adding difference image data taken from the data stream to the prediction image data, thereby to create reproduction image data.

[11] An image coding device (FIG. 19, encoder) according to another embodiment of the invention: divides image data into a plurality of blocks; selects a block similar to a block to be coded from an already-coded area within the same frame to make a prediction signal; and encodes vector information showing a relative position of a block similar to the block to be coded, and a prediction signal, and a difference signal between a block similar to the block to be coded and the prediction signal. The image coding device includes, as a local decoder: a judging module operable to judge which of an already-decoded area and a not-yet-decoded area respective pixel data shown by the vector information are involved in; a pixel-position-calculating module operable to calculate a pixel position at a distance of an integer multiple of a size provided by the vector information from the pixel data judged to be involved in the not-yet-decoded area, and in the already-decoded area; and a prediction-signal-generating module operable to generate prediction image data for pixel data shown by the vector information, based on pixel data of the pixel position calculated by the pixel-position-calculating module, and the pixel data judged to be involved in the already-decoded area.

[12] An intra-frame decoder according to another embodiment of the invention is a device which involves both of a block subjected to an inter-frame coding and a block subjected to an intra-frame coding. The inter-frame decoder includes: an extracting module operable to extract vector information showing a prediction block from a data stream in case that a block created according to the data stream is judged to be of an intra-frame mode; a judging module operable to judge which of an already-decoded area and a not-yet-decoded area respective pixel data shown by the vector information are involved in; a pixel-position-calculating module operable to calculate a pixel position at a distance of an integer multiple of a size provided by the vector information from the pixel data judged to be involved in the not-yet-decoded area, and in the already-decoded area; a prediction-signal-generating module operable to generate prediction image data for pixel data shown by the vector information, based on pixel data of the pixel position calculated by the pixel-position-calculating module, and the pixel data judged to be involved in the already-decoded area; and an image-reproducing module operable to add a difference image data taken from the data stream to the prediction image data, thereby to create reproduction image data.

[13] An intra-frame decoder according to another embodiment of the invention (which enables transformation of prediction signal) includes: an extracting module operable to extract vector information showing a prediction block from a data stream; a judging module operable to judge which of an already-decoded area and a not-yet-decoded area respective pixel data shown by the vector information are involved in; a pixel-position-calculating module operable to calculate a pixel position at a distance of an integer multiple of a size provided by the vector information from the pixel data judged to be involved in the not-yet-decoded area, and in the already-decoded area; a prediction-signal-generating module operable to generate prediction image data for pixel data shown by the vector information, based on pixel data of the pixel position calculated by the pixel-position-calculating module, and the pixel data judged to be involved in the already-decoded area; a prediction-signal-converting module operable to convert the prediction image data generated by the prediction-signal-generating module according to a method shown by the data stream; and an image-reproducing module operable to add difference image data taken from a stream to the prediction image data resulting from the conversion by the prediction-signal-converting module to generate reproduction image data.

2. Further Detailed Description of the Embodiments

The embodiments will be described further in detail. Now, it is noted that as to all the drawings for describing the forms for carrying out the invention, likes members or parts identical in function are identified by the same reference numeral, character or sign, and the repetition of the description thereof shall be avoided.

Before the detailed description of the embodiments, the fundamental rule of the invention will be outlined. The description below focuses on intra-frame decoding.

Figure 3:
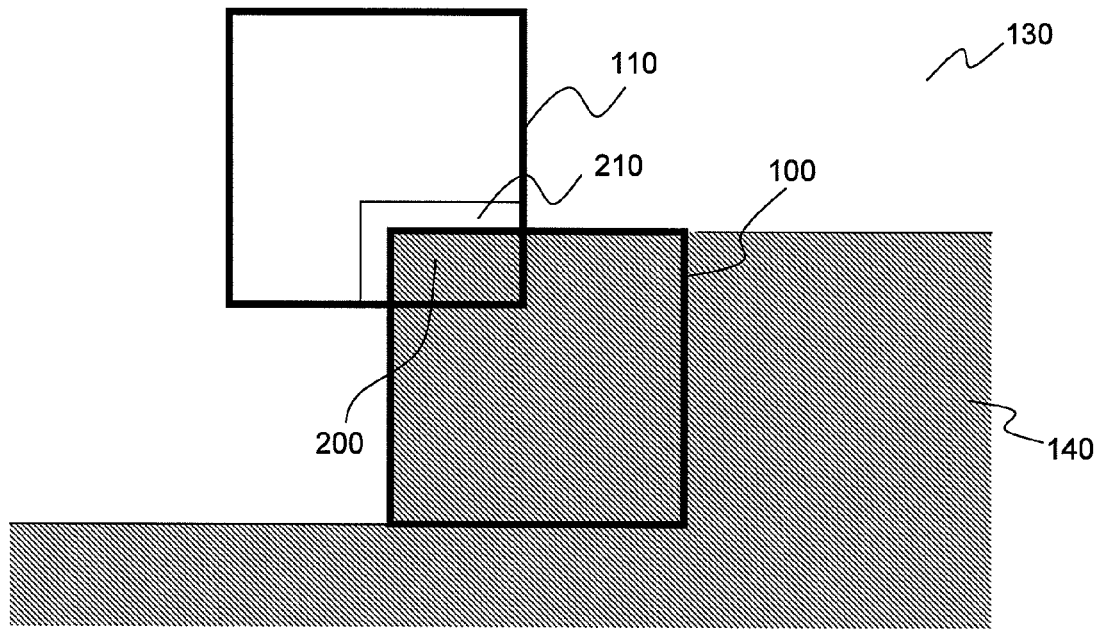
FIG. 3 is a diagram showing that a coding block and a prediction block have an overlap thereof during intra-frame prediction using a vector.
Figure 2:
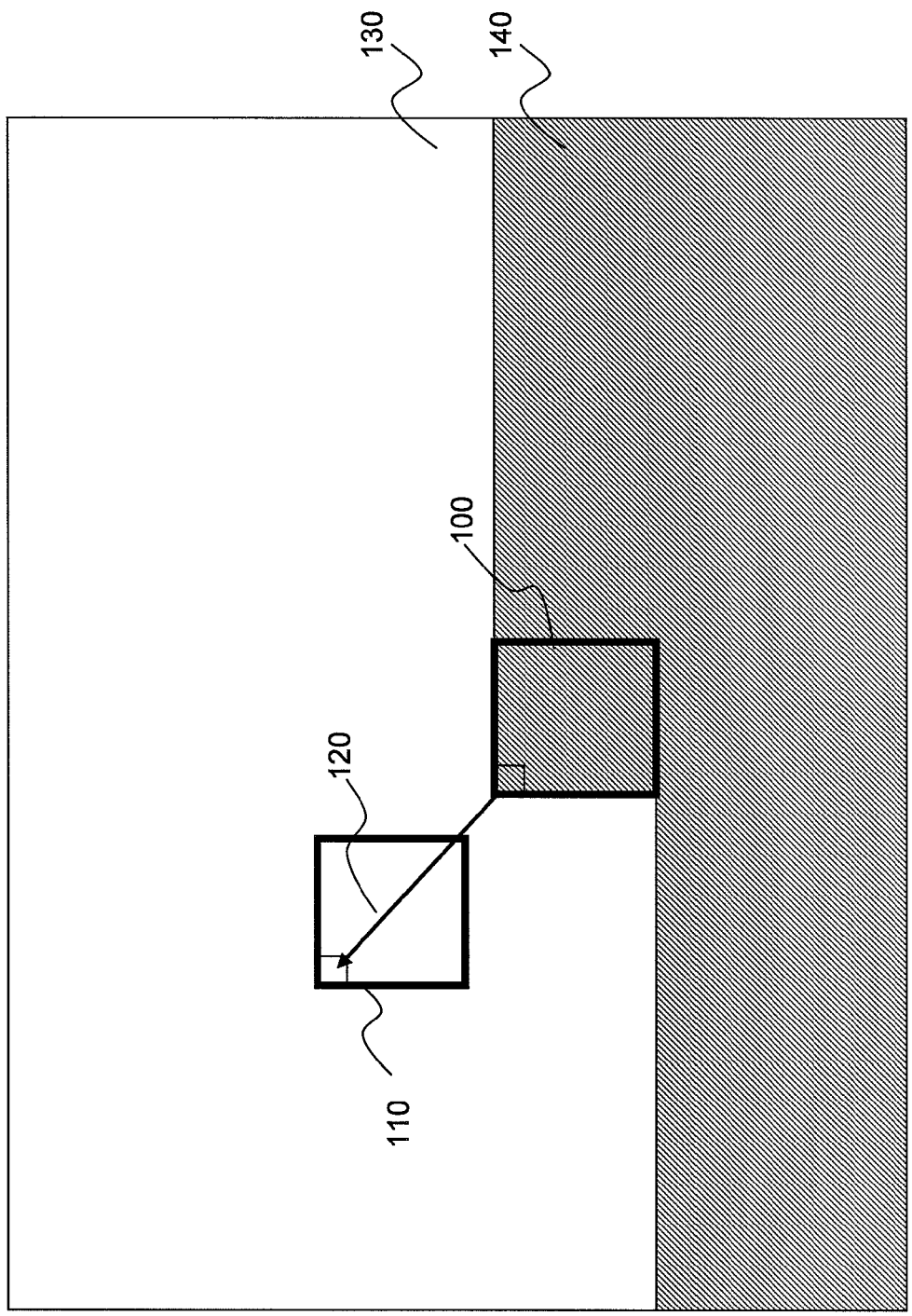
FIG. 2 is a diagram showing a conventional intra-frame prediction using a vector.

In FIG. 4, the prediction block 110 of FIG. 3 and the coding block 100 as a coded target for decode (hereinafter referred to as "coding block" simply), which are separated from each other, and a prediction signal 130 to be produced are drawn for explaining the fundamental rule of the invention. In the prediction block 110, an area denoted by 210 is a defective area belonging to the not-yet-decoded area. The defective area is, in sum, the same area as the area 220 consisting of an upper-left portion of the coding area. Therefore, if assuming that the prediction using the prediction block is conducted correctly, the prediction signal of the area 220 in the coding block corresponds to the area 200 of the prediction block. In other words, the difference signal between the areas 220 and 200 in pixels is small, and data of the two areas are similar to each other. On the other hand, a signal of the defective area 210 is the same as the signal of the area 220 as already described, and therefore that means the defective area 210 is similar to the area 200 in the prediction block. In the invention, the prediction signal 130 is produced taking advantage of the properties, following the rules: (1) for an area on which a signal of an already-decoded area exists (e.g. the areas 200 and 230), a relevant pixel signal is used as the prediction signal; and (2) for an area (e.g. the area 220) relevant to the not-yet-decoded area, the signal of the area 200 is copied, and the resultant signal is used as the prediction signal.

That is to say, this means the prediction from the position of a vector double the original vector 120 is relevant to the area 220 in the prediction block as indicated by the vector 121.

Figure 5:
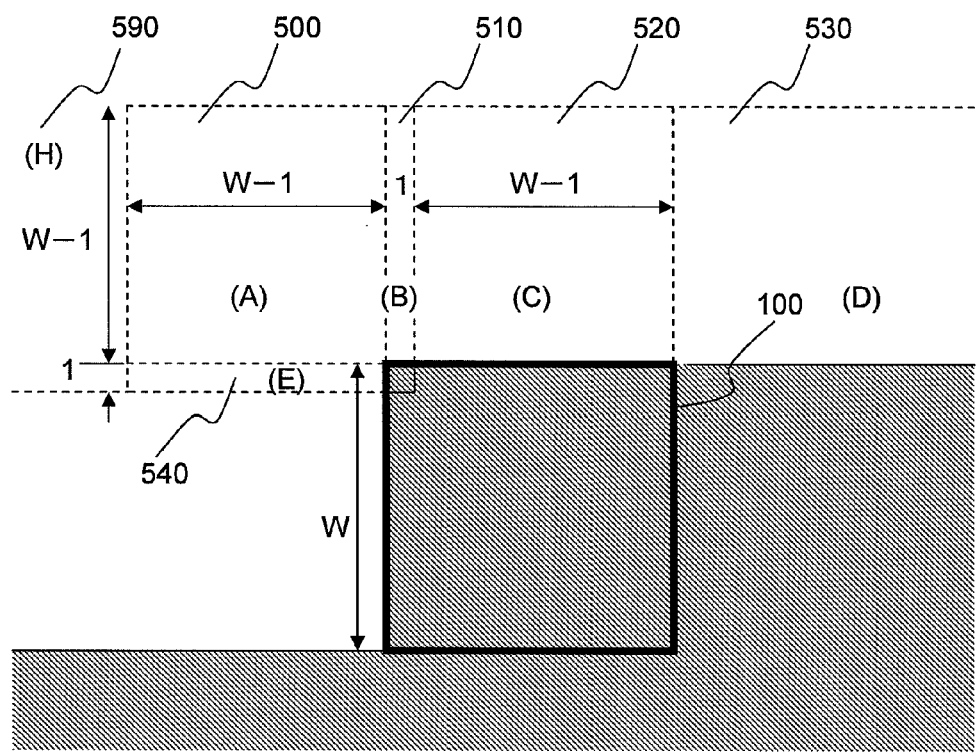
FIG. 5 is a diagram showing a classification according to the position of a prediction vector according to the invention.
Figure 6:
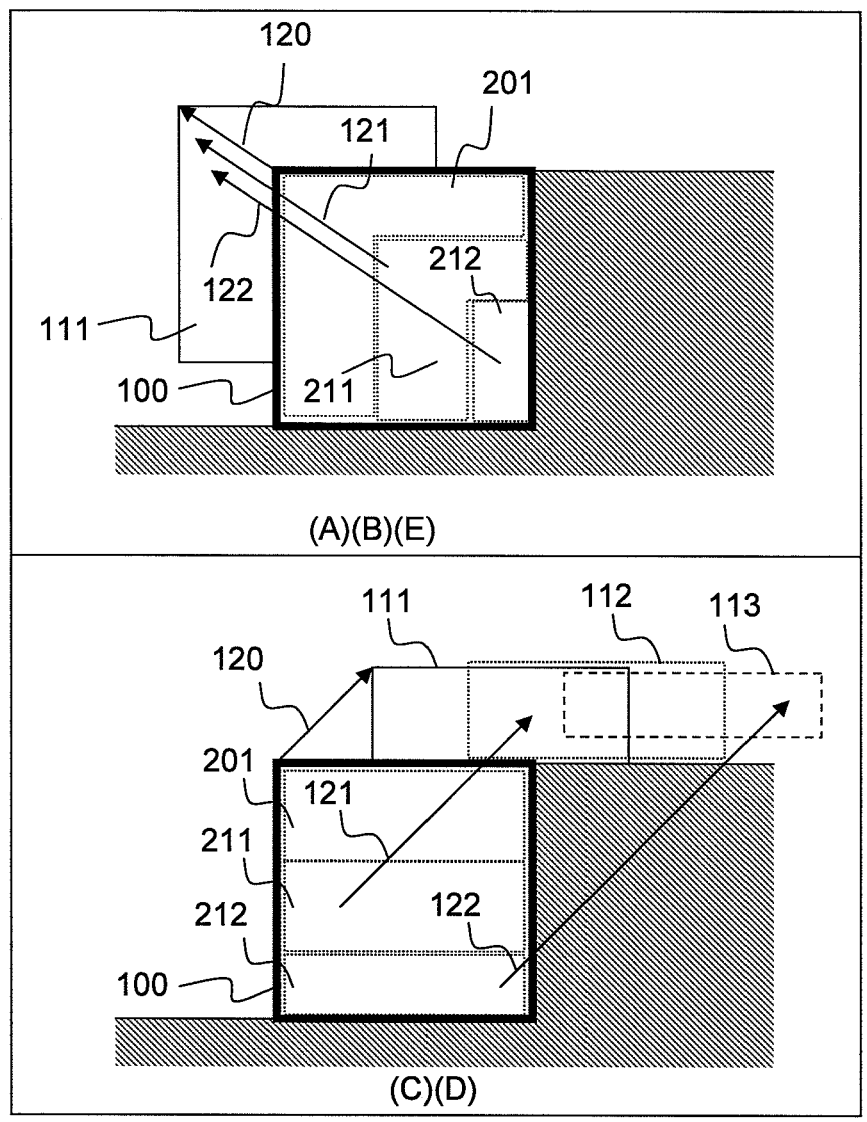
FIG. 6 is a diagram showing the way to process an overlap depending on the position of a prediction vector according to the invention.

FIGS. 5 and 6 show a position indicated by a vector, and the method of producing a prediction signal at the time. Assuming that a coding block is constructed of horizontal W pixels and vertical W pixels, a defective area arises in a prediction block on condition that a position indicated by a vector is located somewhere in areas 500, 510, 520, 530 and 540 of FIG. 5. The areas are labeled with (A), (B), (C), (D) and (E) respectively, and in FIG. 6 an example of generation of a prediction signal in each area is shown. On the other hand, in FIG. 5, the position of a pixel corresponding to a pixel in an upper-left portion of the coding block (shown as a small quadrangular shape) is shown as the position indicated by the vector. Now, it is noted that in the case of the vector indicating an area 590 (H), no defective area arises in the prediction block, and therefore a conventional prediction method can be applied to the case.

The part (A) (B) (E) of FIG. 6 presents examples of the vectors indicating the areas 500, 510 and 540 of FIG. 5. In the examples, prediction signals come from three areas 201, 211 and 212. The area 201 is associated with a pixel signal 111 of an already-decoded area portion in the prediction block. The area 211 is related to the position indicated by a motion vector 121 double the original prediction vector 120 from the area 211, namely to an appropriate portion of the area 111. The area 212 is likewise related to the position an appropriate portion of the area 111, which is indicated by a vector 122 triple the prediction vector 120 from a position in the area 212. In the example of prediction block, vectors up to triple the original prediction vector are used for the prediction signals of the area 211 and area 212 respectively. However, in case that the pixel at the position indicated by the triple vector is a not-yet-decoded area, the multiplication number of the vector is thereafter increased like the quadruple, quintuple, and so on, and eventually a minimum multiplication number is adopted conditional on the vector indicating an appropriate pixel in an already-decoded area.

In FIG. 6, the patterns in the part (C) (D) are different from those in the part (A) (B) (E) in properties. In the cases of the part (A) (B) (E), pixels at positions indicated by double and triple the original vector are used in preparing the areas 211 and 212 of the prediction block respectively, and a signal from the area 201 of the prediction block can be substantially utilized. However, in the cases of the part (C) (D), a signal from the area 200 cannot be used as it is, and therefore signals from the appropriate areas 112 and 113 in the already-decoded area must be taken. This is a case in which a prediction vector is applied to the cases the areas 520 and 530 of FIG. 5, and owing to that a portion on the right of the coding block, i.e. below the area 530 of FIG. 5 is a not-yet-decoded area.

Figure 7:
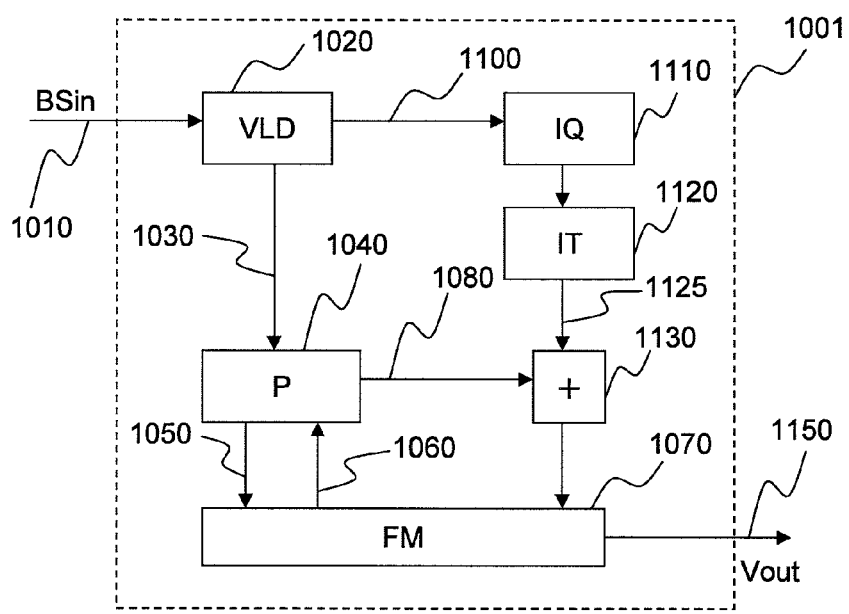
FIG. 7 is a block diagram showing the configuration of an image decoder according to the first embodiment of the invention.

FIG. 7 is a block diagram showing the configuration an intra-frame image decoder according to an embodiment of the invention.

An input data stream 1010 includes a prediction vector, and a difference signal with a prediction signal for each of blocks constituting an image. The decode circuit 1020 extracts a prediction vector 1030 and difference information 1100 from a data stream 1010. The difference information 1100 is passed through the inverse quantization circuit 1110 and the inverse orthogonal transformation circuit 1120, and thus converted into a difference signal 1125. In parallel with this, the prediction signal generator circuit 1040 according to the invention creates an address 1050 indicating an already-decoded area of the frame memory 1070 based on the prediction vector 1030, obtains a pixel signal 1060 of the address, and produces a pixel signal 1080 of a prediction block following the fundamental rule which has been described with reference to FIGS. 5 and 6. The pixel signal 1080 of the prediction block thus produced is added to the difference signal 1125 in the image-reproduction circuit 1130, whereby an image of the block concerned is reproduced. The image thus reproduced is written into the frame memory 1070, and used as a candidate for prediction image creation at the time of reproducing an image of a subsequent block. After the completion of decoding of one frame, a signal of an image thus produced is output as an output signal 1150, which is displayed by a display device such as a television set.

Figure 8:
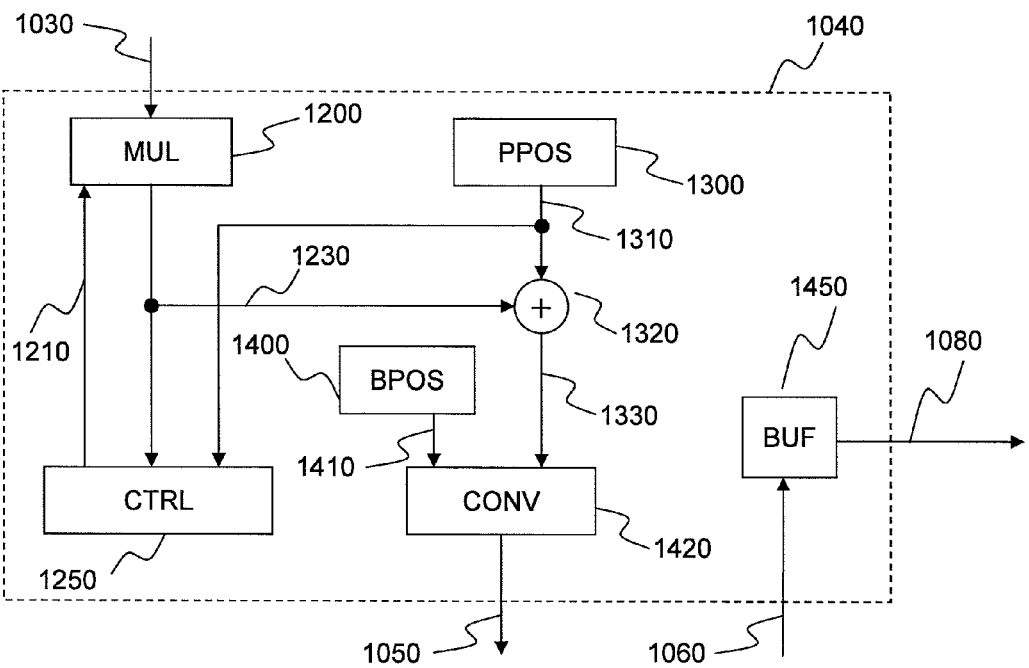
FIG. 8 is a detailed block diagram showing the configuration of a prediction signal generator circuit 1040 in FIG. 7.

FIG. 8 shows a detailed circuit of the prediction signal generator circuit 1040 of FIG. 7. In the prediction signal generator circuit 1040, the pixel-position-information creating circuit 1300 creates pixel position information 1310 of a pixel to be processed in a coding block. The position information 1310 produced there consists of pieces of information of a horizontal pixel position X and a vertical pixel position Y in the block, e.g. X=0 and Y=0 for the pixel at the upper-left corner of the block. In the vector multiplier circuit 1200, the prediction vector 1030 input thereto is multiplied by a multiple (N) indicated by the signal 1210 to produce a multiplied vector 1230. Now, it is noted that in its initial condition, the value of N is one (1). In the adder circuit 1320, the pixel position information 1310 is added to the multiplied vector 1230 (which is the same as the prediction vector 1030 in the initial condition), whereby the pixel position 1330 in the prediction block is calculated. At this step, an addition of the horizontal component N×Vx of the multiplied vector and the horizontal pixel position information X, and an addition of the vertical component N×Vy and the vertical pixel position information Y are conducted independently of each other, and the pixel position in the prediction block is represented by X+N×Vx in the horizontal direction and Y+N×Vy in the vertical direction with respect to a pixel at the upper-left corner of the coding block, where the horizontal component of the prediction vector is denoted by Vx, and the vertical component is denoted by Vy. Now, it is noted that these values can take negative values.

On the other hand, a control circuit 1250 outputs one (N=1) as the multiplication signal 1210 in its initial condition. From the multiplied vector 1230 and the pixel position information 1310, the control circuit 1250 judges whether or not the pixel concerned in the prediction block is in an already-decoded area. The judgment is performed following the policy below:

If X+N×Vx<0 and Y+N×Vy<Wy−1, the pixel is judged to be in an already-decoded area;

If X+N×Vx>=0 and Y+N×Vy<0, the pixel is judged to be in an already-decoded area; and Otherwise, the pixel is judged to be in a not-yet-decoded area, where Wx is the size of the block in the horizontal direction, and Wy is the size in the vertical direction.

In case that the result of judgment is "not-yet-decoded area", the control circuit 1250 advances the multiplication signal 1210 until the result of judgment becomes "already-decoded area". Specifically, in FIG. 6, for example, in any case of (A) to (E), N=2 is output on condition that the pixel is in the area 211, whereas N=3 is output on condition that the pixel is in the area 212.

The pixel position 1330 in the prediction block is added to a block position 1410 of a block of interest in a picture, which is created by a block-position creation circuit 1400, and further converted into the appropriate address 1050 on the frame memory in a address creation circuit 1420. On receipt of input of the pixel signal 1060 from a pixel indicated by the address 1050 thus converted, the prediction signal generator circuit 1040 stores the pixel signal in a buffer 1450 for a time, and then outputs it as the prediction signal 1080 with an appropriate timing.

After the completion of processing of a pixel, the pixel-position-information creating circuit 1300 advances the pixel position information 1310 of a pixel in the coding block, which is to be processed in the subsequent step, to the subsequent pixel position, and the control circuit 1250 resets the multiplication signal 1210 to 1 (N=1), and proceeds to the processing of the subsequent pixel.

After the completion of processing of all the pixels in the block, the block-position creation circuit 1400 advances the block position 1410 to the subsequent block position.

While in the description concerning FIG. 8, it has been described that the multiplier circuit 1200 calculates N times the motion vector, the multiplier circuit 1200 need not have a multiplier. The reason for this is as follows. The multiplication (the value of N) is advanced by one for each advancement like 1, 2, 3, . . . . Therefore, the prediction vector is held in the multiplier circuit for a time, and when the multiplication number is increased by one, the multiplication can be performed by adding the prediction vector to the vector value so held. Thus, the circuit can be reduced.

In addition, a conversion table which accepts as input the size of a vector making a basis and the multiplication number N thereof, and which outputs a new vector corresponding to the input may be arranged instead of the multiplier circuit 1200 module. Using such conversion table enables the execution of a nonlinear process, specifically a process which includes multiplying a vector used as a base by an integer within a certain range, and multiplying by a different multiplying factor or performing a fixed value (clipping) in the other range.

Meanwhile, in case that the pixel position for generating the prediction signal indicates a position outside the picture, any of the following measures to take is decided in advance.

(1) Prediction in which a pixel outside a picture is referred to is prohibited (a restriction is place on coding, and no special measure is taken on decoding).

(2) A pixel of interest is created according to a given method which has been decided previously in the case of referring to a pixel outside the picture. For example, as in MPEG-4, if x<0 in the coordinate (x,y) to refer to (outside from the left edge of a picture), a pixel at (0, y) is used.

(3) With a pixel outside a picture referred to, another prediction pixel creating method is used. (See the description about FIG. 14(D')).

Figure 9:
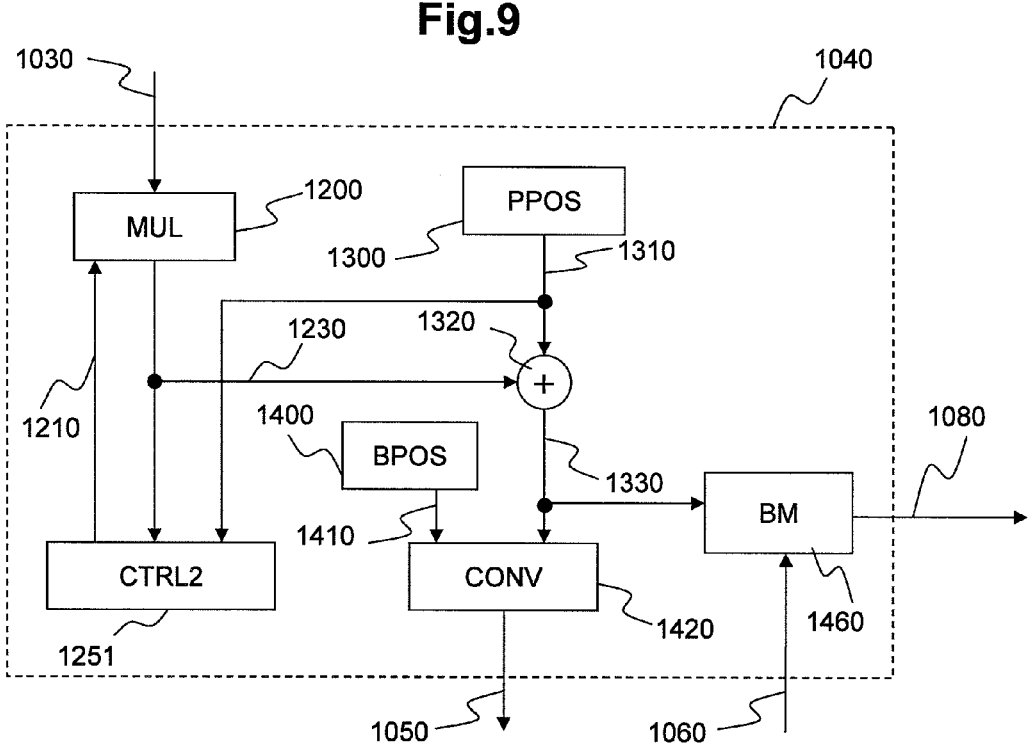
FIG. 9 is a detailed block diagram of an modification of the prediction signal generator circuit 1040 of FIG. 8.

FIG. 9 shows another embodiment of the prediction signal generator circuit 1040 of FIG. 7, which is different from the prediction signal generator circuit of FIG. 8 in that a block memory 1460 is provided instead of the buffer 1450, and which is an embodiment such that a signal of the area 201 of a prediction block is utilized at the time of generating a prediction signal of a defective area, which has been described for FIGS. 6(A), (B) and (E), in the description of FIG. 6. Specifically, the prediction signal generator circuit 1040 stocks a signal of a prediction block in the block memory 1460, and in the case of prediction such that just access to a pixel in the prediction block suffices, the prediction signal generator circuit 1040 outputs a signal stocked in the block memory 1460 without accessing the frame memory 1070.

In FIG. 9, a signal obtained by accessing the frame memory 1070, namely a signal 1060 taken from an already-decoded area is stored at an address corresponding to a position in the block of the block memory 1460. At this time, the control circuit 1301 outputs 0 (N=0) as the multiplication signal 1210, whereby the address 1330 of the block memory becomes the same as the pixel position information 1310 in the block. Consequently, a signal 1060 can be written into the block memory at a given position.

However, at the time of reading, in the case of a pixel taken from an already-decoded area, the reading from the block memory is performed with N=0 as in the writing. In the case of outputting a pixel of a not-yet-decoded area, the address 1330 of the block memory is created using the value N to originally read from the memory frame minus one as the multiplication number 1210, whereby a pixel which has been read in once, namely data of the position of the area 211 of FIG. 7 can be read out. Thus, the number of accesses to the frame memory 1070 can be decreased. Further, the power involved in access to the frame memory, and the width of a bus for the frame memory can be reduced. In addition, in the case of the access to the block memory higher than the access to the frame memory in speed, the processing time can be shortened, or the operation frequency can be made lower, and further that contributes to the reduction of power.

Incidentally, in the cases of (C) and (D) of FIG. 6, as there is no appropriate data in the block memory, access to the frame memory 1070 in FIG. 9 cannot be skipped except access in some conditions.

The above descriptions of the embodiments present handle the examples where the invention is embodied in a form of hardware. However, the invention can be also embodied in a form of software. Now, with reference to FIG. 10, a prediction pixel creating algorithm according to the invention will be described.

Figure 10:
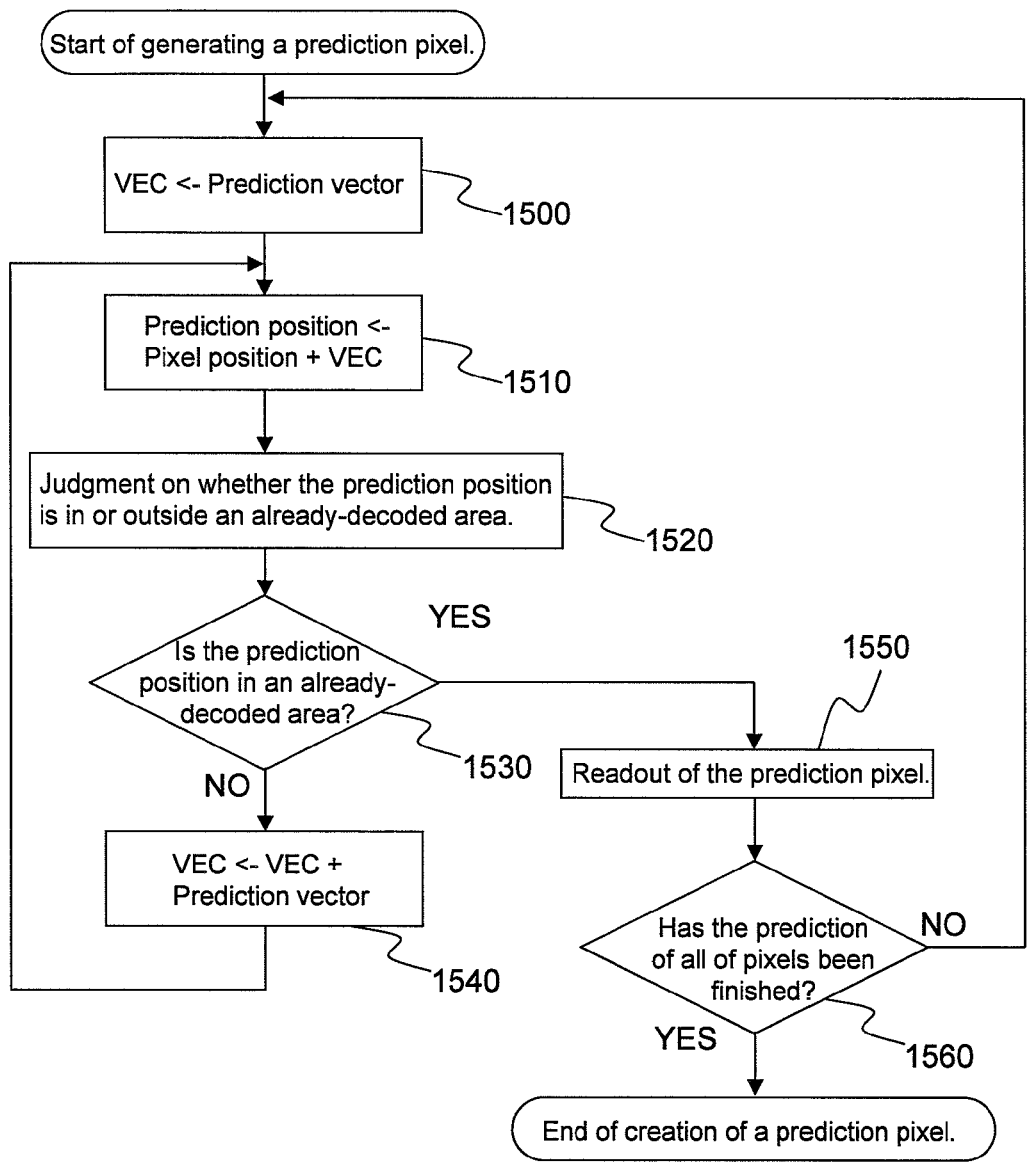
FIG. 10 is a flow chart of an algorithm for producing a prediction signal according to the second embodiment of the invention.

FIG. 10 is a flow chart of an algorithm for producing a prediction pixel signal of a block in the invention. In processing a pixel in a block, the value of a prediction vector substituted into a variable VEC is held in the step 1500. In the step 1510, the value (vector value) of the variable VEC and the position of a pixel concerned are added up, whereby a prediction signal position is obtained. At this time, the pixel position, and the prediction signal position are both presented by the two-dimensional coordinate. In adding the pixel position and vector value, the horizontal and vertical components are calculated independently of each other. The prediction pixel position thus calculated is used to check on whether or not the prediction pixel position is in an already-decoded area. The method of making the check is practiced according to the expressions of inequality shown in the description concerning FIG. 8. In case that the prediction pixel position is not in an already-decoded area, the prediction vector value is added to the variable VEC in the step 1540. In other words, this corresponds to the processing of advancing the multiplication number N, which has been used in description on the hardware, to N+1. Then, using a new VEC, a judgment is made again about whether the prediction pixel position is in or outside an already-decoded area, and until the prediction pixel position is judged as being in an already-decoded area, the change in VEC is continued (advancement of N is continued) in the step 1540. If the prediction pixel position is judged as being in an already-decoded area in the judging step 1530, the signal of the prediction pixel position is read out in the step 1550, and the read pixel is made the prediction signal of the pixel concerned. The series of steps are conducted on all of pixels in the block. If in the judgment 1560, the processing on all the pixels in a block is judged as having been finished, the creation of prediction pixel signals of one block is terminated.

Figure 11:
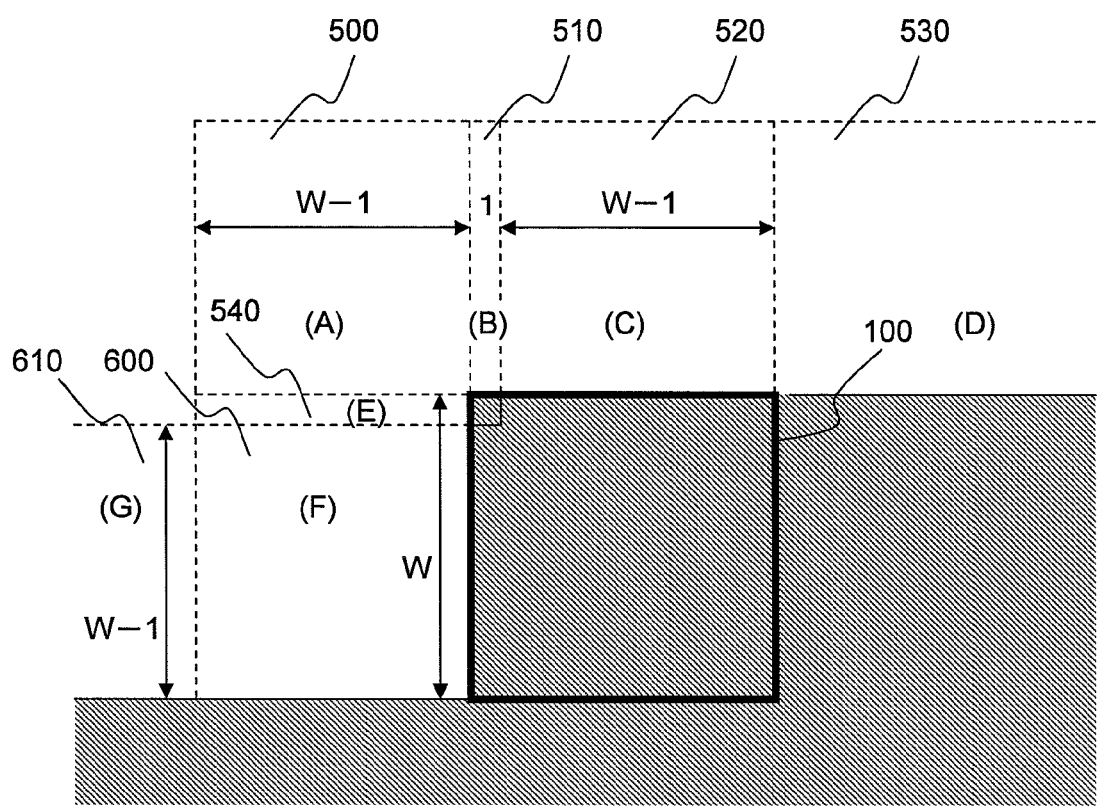
FIG. 11 is a diagram showing another classification according to the position of a prediction vector according to the invention.
Figure 12:
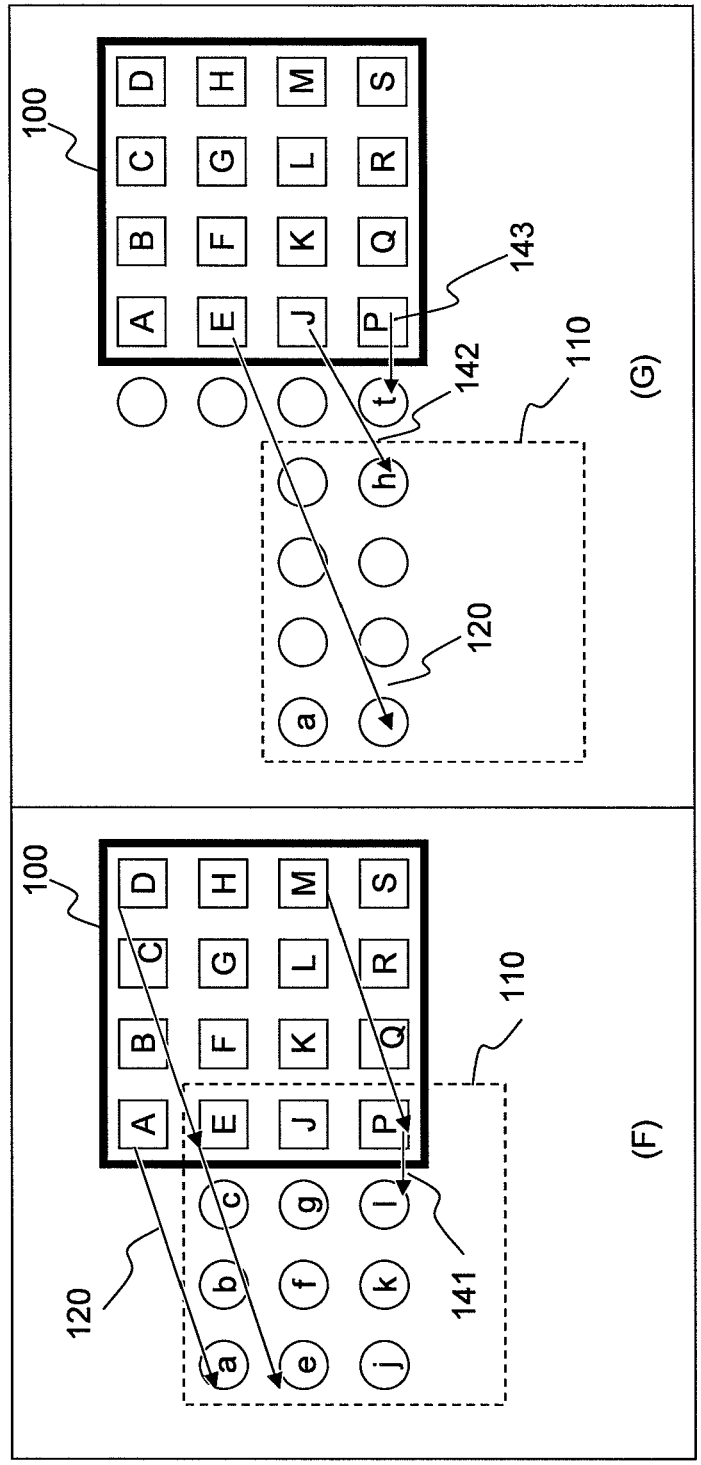
FIG. 12 is a diagram showing the step of producing prediction signals concerning areas (F) and (G) in FIG. 11.

FIGS. 11 and 12 are diagrams for explaining a modification of the invention. In the modification of FIG. 11, the processing on areas 600 (F) and 610 (G) of FIG. 11, which is not covered in the example of FIG. 5, is allowed. In the areas (F) and (G), the prediction vector points downward in the drawing, and therefore the creation of the prediction signal cannot be coped with by the means of multiplying a prediction vector, which has been described.

FIG. 12 is an illustration of processing when the prediction vector is pointing downward, i.e. the prediction vector is pointing the areas 600 and 610 of FIG. 11. In FIG. 12, a circular mark represents a pixel in an already-decoded area, and a quadrangular mark represents the position of a pixel in a coding block. In the case of (F) of FIG. 12, a prediction image corresponding to a group of portions A to M of the coding block 100 of the drawing can be created by pixels a to 1 of the already-decoded area. However, when determining pixels corresponding to portions P, Q, R and S of the coding block 100, the prediction vector is degenerated according to the following set of expressions until the prediction vector indicates within an already-decoded area.

$Vx'=\max(Vx/(2^N),1)$, and $Vy'=Vy/(2^N)$, where max(u,v) returns, of the values u and v, the bigger one, "/" represents a division by which a small number resulting from the division is truncated toward zero, and 2^N represents 2 to the N-th power.

Incidentally, in FIG. 11, the horizontal direction toward the right is the positive direction of X, and the vertical direction downward is the positive direction of Y. In other words, as to prediction vectors pointing the areas 600 and 610, Vx<0, and Vy>0.

The value of N is advanced by one for each advancement. Then, an image signal when a pixel in an already-decoded area is indicated by Vx' and Vy' is used as a prediction signal. For instance, in the example of the pixel P of (F) of FIG. 12, on the assumption of (Vx, Vy)=(−3, 1) with the initial prediction vector 120, (Vx',Vy')=(1,0) with a degenerate vector 141 when N=1, which indicates the pixel 1. Therefore the value of the pixel 1 is used as a prediction value. Also, in the case of the prediction vector indicating the area 610, a prediction signal is created by the same processing, as shown in (G) of FIG. 12. In the example of (G) of FIG. 12, on the assumption of (Vx,Vy)=(−5,2) with the prediction vector 120, (Vx',Vy')=(−2,1) with a degenerate vector 142 when N=1 as to the pixel K, and therefore the pixel h is made a prediction pixel. As to the pixel P, (Vx',Vy')=(−1,0) with a degenerate vector 143 when N=2, and therefore the pixel t is made a prediction pixel.

As described above, in the cases of the prediction vector indicating the areas 600 and 610 of FIG. 11, it is made impossible by using the degenerated vector to cope with a periodic image pattern. However, the prediction of an image (e.g. a straight line segment) having continuity and extending to the upper-right direction on the picture can be performed correctly and therefore, a higher efficiency of coding can be achieved in comparison to the foregoing embodiment.

Figure 13:
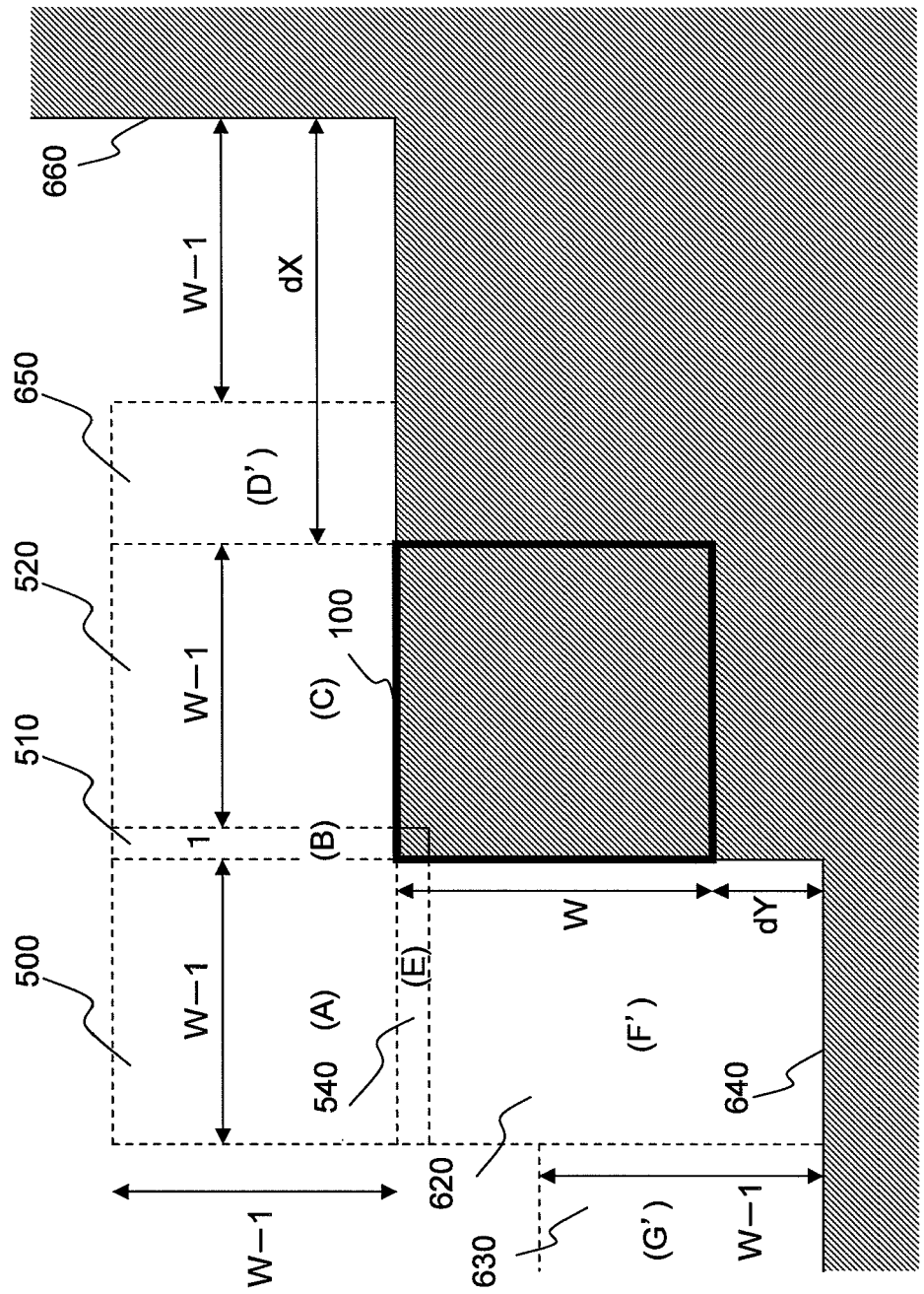
FIG. 13 is a diagram showing a modification of an already-decoded area according to the invention.

FIGS. 13 and 14 are diagrams for describing another embodiment of the invention. FIGS. 5 and 11 are based on the assumption that on the left of the coding block, the boundary of an already-decoded area is at the same height as the lower side of the coding block in a vertical direction, whereas in the right direction, the already-decoded area is contiguous and extends infinitely. However, in actual coding and decoding, the vertical position of the lower side of a coding block can be different from that of the boundary of an already-decoded area as shown in FIG. 13, or the right side of an already-decoded area may be restricted in some cases. The difference in the left-side vertical position is relevant to e.g. the case that subsequent to coding 100 of the coding block of FIG. 13, a lower portion of a coding block is coded first (in this case, dY of FIG. 10=W). The right-side restriction corresponds to an end of a picture.

The part (F') (G') of FIG. 14 presents examples when the prediction vector indicates areas 620 and 630. In this case, a pixel signal of a prediction block is calculated according to the following method.

Step 1: Whether or not a pixel of interest is a pixel of an already-decoded area is judged while advancing N0 like 1, 2, . . . according to the following expressions. If the pixel of interest is a pixel belonging to the already-decoded area, the signal value of the pixel is used as a prediction value, then Step 2 is totally skipped.

$Vx'=N0 \times Vx$, and $Vy'=N0 \times Vy$

In case that N0 satisfies the following expression of inequality in Step 1, Step 1 is terminated, and then Step 2 is processed.

$N0 \times Vy+Y>W+dY$, where X is a relative horizontal position of a processing pixel in a coding block with respect to a pixel in an upper-left portion in the block, and Y is a relative vertical position thereof.

Step 2: In regard to N0 which meets the expression of inequality, the value of a pixel of the following position relative to the pixel in the upper-left portion of the block is used as a prediction value.

$(-1, \min(W+dY-1, Y+(Vy \times (1+X))/(-Vx)))$, where min(a,b) returns, of the values a and b, the smaller one. Further, in regard to the areas (F') and (G'), Vx<0.

With the above expression, e.g. a pixel 151 in a coding block in the part (F') (G') of FIG. 14 corresponds to a pixel 153 where a point extending from a pixel 151 in the direction of the prediction vector 120 first crosses the already-decoded area. Further, in regard to the prediction pixel signal of a pixel 152 in the coding block, there is no already-decoded area in the direction of extension of the prediction vector 120 from the pixel 152, i.e. the term W+dY−1 inside the parentheses of min in the above expression is selected, and therefore a pixel 154 is used.

(D') of FIG. 14 is for describing the generation of the prediction pixel signal when the motion vector is in the area (D'). In the example of (D') of FIG. 14, areas 215 and 216 which are used for prediction of the areas 211 and 212 originally belong to a not-yet-decoded area. In this case, a pixel value of the area 110 is used as a prediction value for the areas 211 and 212.

The case in which an already-decoded area on the right side is subject to a restriction beyond control, such as the presence of the right end of the picture has been described with reference to (D') of FIG. 14. However, it is also possible to virtually provide a right-side boundary 660 as in FIG. 13 for the purpose of limiting a pixel access in the right direction of the picture. In the example of FIG. 13, by keeping the value of dX set to a fixed value (e.g. 8) at all times, the range of pixels used for generation of prediction signals involved with a block can be restricted, and the addition of memory access can be lightened.

The restriction range of pixels used for generation of prediction signals is described in e.g. a data stream to be input. The information of the restriction range is extracted from the stream prior to decoding, the extracted information of the restriction range is used in decoding of a subsequent stream. As described above, it is made possible by describing the restriction range in a data stream to change the restriction range according to the throughput of a device operable to decode a data stream. For instance, by setting a wider restriction range on a data stream which is reproduced by a decoder of high throughput, the efficiency of coding can be increased. The information of the restriction range is described in stream information 4000 or frame information 4100 of FIG. 20. In the case of the information of the restriction range described in the stream information 4000, the same restriction range is adopted for all the streams concerned. In the case of the restriction range information described in the frame information 4100, the restriction range can be changed from frame to frame.

Figures 15, 16:
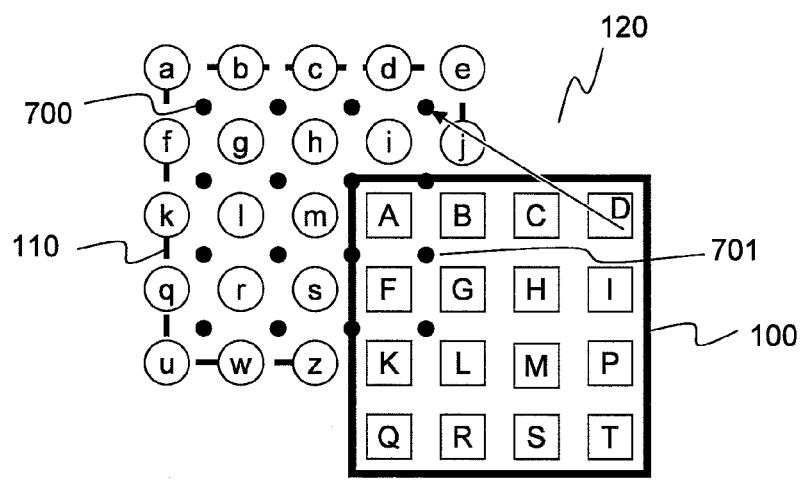
FIG. 15 is a diagram showing an order of processing blocks to process according to the invention.
FIG. 16 is a diagram showing half-pel prediction of the invention.

FIG. 15 is a diagram showing an order of block prediction. In image coding according to MPEG or the like, a macro block with luminance signals arranged in 16 pixels× 16 lines is treated as the processing unit of coding. FIG. 15 presents the order of processing on condition that the size of a block (sub-block) to perform the intra-picture vector prediction according to the invention is smaller than a macro block. Further, FIG. 15 shows an example when the sub-block size is a quarter of the macro block size, i.e. 4 pixels×4 lines vertically and horizontally. The part (1) of FIG. 15 is an example of scanning sub-blocks in a macro block in the direction of the right from the upper-left one as shown in the drawing. The part (2) of FIG. 15 presents an order of scanning in which sub-block processing is completed in units of 8 pixels×8 lines. At the time when the processing of each of the sub-blocks 4, 8 and 12 is finished, data of 8 pixels×8 lines including data of the sub-block 4, 8 or 12 are all prepared. Therefore, the efficiency of processing becomes higher in the case of using the type of scanning and the processing in units of 8 pixels×8 lines in combination. Besides, in the part (1) of FIG. 5, in the case of producing a prediction signal of the sub-block 5, for example, a portion corresponding to the right (the area 650 (D') of FIG. 13) with respect to the sub-block is the sub-block 2 or 3. However, in the case of producing a prediction signal of the sub-block 3 located in the same position in the part (2) of FIG. 15, an area corresponding to the area D' is only an area of a one-pixel width consisting of a left-end portion of the sub-block 2. Therefore, the way of scanning shown in the part (2) of FIG. 15 can achieve a higher efficiency of prediction.

The information of a prediction vector is decoded in sub-blocks. Adjacent sub-blocks are often similar to each other in the prediction vector. Therefore, the difference between the prediction vector of a sub-block of interest, and that of the neighboring sub-block is transmitted as prediction vector information. In regard to the sub-block 6 in the part (1) of FIG. 15, for example, vectors of the sub-blocks 5, 2 and 3 as an sub-block which neighbors the sub-block 6 and has been already decoded can be used. If the vectors of these three sub-blocks are expressed as (Vax,Vay), (Vbx,Vby) and (Vcx,Vcy) respectively, the prediction signal (Vpx,Vpy) of the vector of the sub-block 6 yet to be decoded is as follows.

$Vpx$=Median($Vax,Vbx,Vcx$), and $Vpy$=Median($Vay,Vby,Vcy$), where Median (a, b, c) provides a value which would be in the second (center) position if the values a, b and c were arranged in descending order.

The decoded difference signal is added to the prediction signal (Vpx,Vpy) of the vector, and thus the prediction vector signal is obtained. In regard to a sub-block (e.g. sub-block 1) located on the border of a macro block, on condition that the prediction vectors of sub-blocks of macro blocks surrounding it have been held, they are used to produce the prediction signal of the vector of the sub-block in question, whereby the prediction vector values are obtained. Further, on condition that the macro block is in contact with the boundary of the picture, and no sub-block exists in an appropriate position, the values of a vector which does not exist are set as (0,0), whereby prediction vector values can be determined in the same way. Now, the following are noted: on condition that no sub-block exists in an appropriate position, the vector which does not exist is set as (0,0) if the number of sub-blocks which do not exist is one; the vector of an (one) existing sub-block is made a prediction signal if the number of sub-blocks which do not exist is two; and the prediction signal may be set as (0,0) if the number of sub-blocks which do not exist is three (even one sub-block does not exist).

FIGS. 16 and 17 present a modification for calculating a signal value of a prediction block. FIGS. 16 and 17 cover an example of using a prediction comparable to the half-pel prediction used in motion-compensated inter-frame prediction according to MPEG or the like, and specifically using a vector of an accuracy of one half the inter-pixel distance.

FIG. 16 presents an example of processing in case that the accuracy of the intra-picture vector is a half-pel. In the drawing, the vector 120 is of (−2.5,−1.5). For instance, the position of a prediction pixel associated with a pixel A in a coding block 100 is the pixel position 700. In this condition, the prediction signal value A' is as follows.

$A'=(a+b+f+g+2)>>2$, where a, b, f, g are each a signal value of a pixel shown in FIG. 16, and >> is a symbol of a bit-shift operation; >>2 means an operation of two-bit right shift, namely ¼. "+2" in the above expression is for making an arrangement such that the quotient resulting from execution of ¼ division is rounded with respect to (a+b+f+g)>>2.

In an overlap of the blocks, e.g. a pixel position 701, therefore a prediction signal value T' of a pixel T is given as follows.

$$T'=(A'+B'+F'+G'+2)>>2,$$

where A', B', F' and G' are prediction values of pixels A, B, F and G, respectively.

As for pixels required for the prediction in the case of performing the half-pel prediction, pixels more than those involved with prediction using a vector of an accuracy of an integral number by a number of pixels constituting a one-pixel width are used horizontally and/or vertically. Therefore, in various judgments involved with the method of creating a prediction pixel, which has been described, it must be a measure thereof that pixels necessary for creating a prediction pixel are all located in an already-decoded area.

FIG. 17 is a block diagram of a prediction signal generator circuit 1041 operable to perform the processing as in FIG. 16, and FIG. 18 is an operation timing chart of the picture prediction signal generator circuit 1041 when performing the processing as in FIG. 16. The pixel-position-information creating circuit 1301 outputs pixel position information as shown by the signal 1310 in the timing chart of FIG. 18. In the example of FIG. 16, because of the coding block size of 4 pixels×4 lines, horizontal and vertical components of the pixel position information 1310 both take a value in a range from 0 to 3, in the circuits as in FIGS. 8 and 9. However, information of an area larger than the size of a coding block by one pixel horizontally and vertically is required for conducting the process of half-pel prediction, as already shown in FIG. 16. In response to input of this information, the prediction signal generator circuit 1041 performs processing similar to the processing already described with reference to FIGS. 8 and 9, and thus pixels of an already-decoded area involved with the prediction signal generation of FIG. 16, i.e. pixels a, b, c, d, e, f, g, h, I, j, k, l, m, q, r, s, u, w, and z are obtained following the timing shown by 1060 of FIG. 18. The pixel signals 1060 are stored in the block memory 1461. In this example, the block memory 1461 has a capacity for 25 pixels comparable to 5 pixels×5 lines, is acceptable to write of a signal from one of two-system inputs (1060 and 3021), and is operable to output signals (3040 and 3070) of two independent systems concurrently. Now, it is noted that a signal line and other parts for selecting one of the two-system inputs to accept an information write from are omitted. Further, the word "concurrently" used here means that the processing for read or write is completed during a period of the processing unit from the time 3100 to the time 3110 of FIG. 18, for example, and the following arrangement may be made: the unit period is segmented into a plurality of parts (e.g. three segmented periods), and a set of write, first read, and second read are performed serially in each segmented period.

From the block memory 1461, two pixel signals which have been written therein are read out according to the timings shown by 3040 and 3070 of FIG. 18. For instance, at the time 3100, a signal of the pixel "a" of FIG. 16 is read out to the signal 3040, and a signal of the pixel "f" is read out to the FIG. 3070. These signals are delayed in the delay circuits 3050 and 3080 by the processing unit time, and then form signals 3060 and 3090, respectively. Specifically, at the time 3110, signals of the pixels a, b, f and g are output for the signals 3060, 3040, 3090 and 3070 respectively, and the half-pel processing circuit 3000 uses the four pixels to produce, as a prediction signal 1080, a prediction signal A' to use for prediction of the pixel A of FIG. 16. Incidentally, on condition that any one of horizontal and vertical components of the prediction vector is a value of an accuracy of an integral number conveniently, of the four pixels, needed two pixels are used. However, on condition that the horizontal and vertical components both take a value of an accuracy of an integral number, only the signal 3060 is used. As described above, in case that one or both of the horizontal and vertical components of the prediction vector makes a signal of an accuracy of an integral number, pixels which are not used for prediction signal generation exist, and it is not required to read these pixels from the frame memory.

The prediction signals 1080 thus produced are output as prediction signals, and some of the prediction signals, which are necessary for producing other prediction signals, are delayed by a required time (quintuple the processing unit time in this example) in the delay circuit 3020, and then written in the block memory 1461 as signals 3021. The timing of this write is the same as that shown by 3021 of FIG. 18; the signals are written with the timing which arranges pixels to be surely consecutive subsequent to the pixel "m" on the picture of FIG. 16 in terms of position. Incidentally, signals written from a signal 3021 are of the pixels A', B', F', G', K' and L'. Signals written through the signal 3021 are used for subsequent prediction signal generation in the same way as signals written through the signal 1060.

The half-pel prediction like this further increases the efficiency of prediction because a more precise accuracy can be specified in terms of prediction position. With a larger portion where a coding block overlaps with a prediction block, pixels in a lower-right portion of the prediction block (which correspond to M', P', S' and T' in the example of FIGS. 16 and 1080 of FIG. 18) are not actual pixels, and therefore the probability of error involved therein is higher than other prediction signals. However, in the method according to the invention, the signals A', B', F' and G' are used for generation of a prediction signal T' of the pixel T, for example, and further signals of nine pixels, i.e. pixels a, b, c, f, g, h, k, l and m, are used for creation of these signals. Therefore, a prediction error coming from each pixel is reduced, which prevents the decline in the efficiency of prediction.

Figure 19:
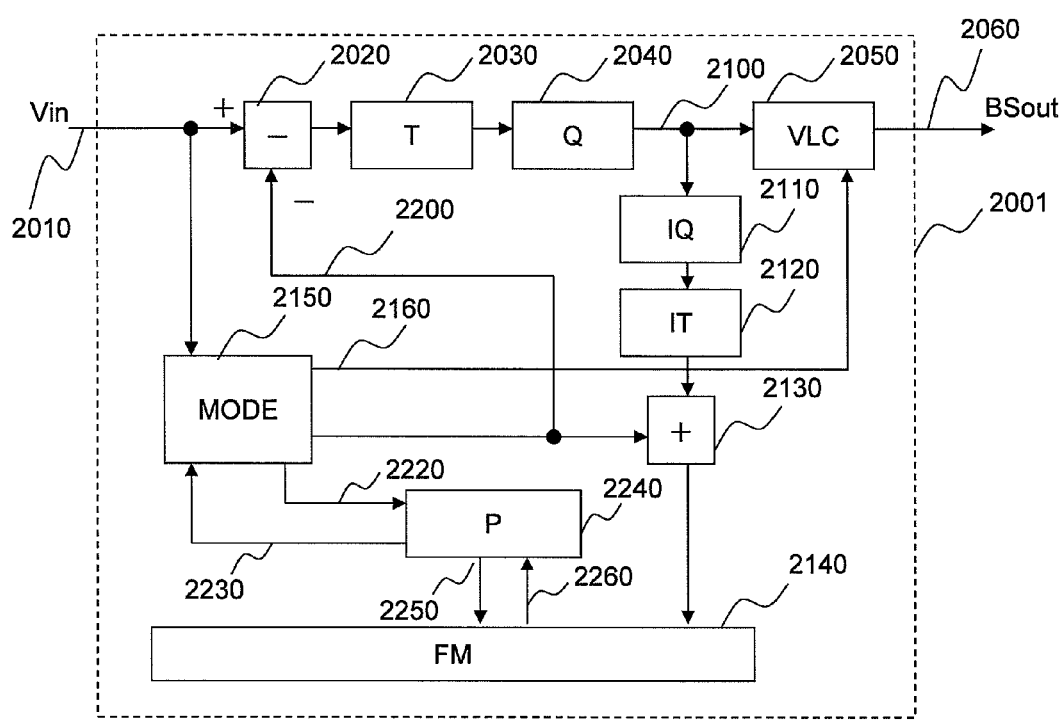
FIG. 19 is a block diagram showing the configuration of an image decoder according to the third embodiment.

FIG. 19 shows a configuration of an coding device which the invention is applied to, as the second embodiment of the invention.

Input image signals 2010 are sorted and input in blocks. The input signals 2010 go through the difference-taking circuit 2020, where the differences between input signals 2010 and prediction signals 2200 to be described later are taken in pixels, thereafter through conversion into signals 2100 by a combination of the orthogonal transformation circuit 2030 and the quantization circuit 2040, and then through conversion into codes in the code circuit 2050. The resultant signals are output as a data stream 2060. However, in parallel, the signals 2100 go through inverse conversion into difference signals by a combination of the inverse quantization circuit 2110 and the inverse orthogonal transformation circuit 2120, and through additions to the foregoing prediction signals 2200 in pixels in the adder circuit 2130, and thus image signals (forming a local decode image) which are the same as those provided by a decoder can be obtained. The local decode image is written into the frame memory 2140, and will be used for subsequent generation of prediction signals 2200.

The prediction signals 2200 are created in the prediction-mode deciding circuit 2150 as follows. The input image signals (coding block) 2010 are input to the prediction-mode deciding circuit 2150. The prediction-mode deciding circuit 2150 prepares a plurality of prediction vectors which make candidates of prediction signals of a coding block concerned, and inputs them as prediction-candidate vectors 2220 to the prediction signal generator circuit 2240 in turn. The prediction signal generator circuit performs the same processing as the prediction signal generator circuit 1040 and 1041 do, which has been described for the above embodiments, thereby to creating a prediction signal 2230 coming from the designated prediction-candidate vector, out of pixel signals of an already-coded area (corresponding to an already-decoded area in the foregoing embodiment) in the frame memory. The prediction-mode deciding circuit 2150 takes differences between the input signals 2010 (coding block signals) and prediction block signals (2230) in pixels, and calculates prediction errors. Then, after having calculated prediction errors of all of the prediction-candidate vectors, the prediction-mode deciding circuit 2150 sets the prediction-candidate vector involving the smallest prediction error (offering a prediction signal the most similar to the input signal) as a prediction vector 2160, and outputs the prediction signal 2200 corresponding to the prediction vector 2160. Incidentally, the information of the prediction vector 2160 is superposed on a data stream 2060 in the code circuit 2050.

Although a local decode image stored in the frame memory 2140 is used for the prediction signal when calculating a prediction vector 2160 involving the smallest prediction error, the input image signals 2010 may be used instead of the local decode image. However, also in this case, the prediction signal 2200 must be produced from a local decode image in order to prevent the accumulation of error in the decoder. As to a method of using an input image to search for an optimum vector, the higher the image quality of an image to be coded is, the closer to an input image the local decode image is, and therefore the efficiency of prediction is higher. In addition, in the case of processing a certain block, on condition that a local decode image is used to search for a vector, a search for a vector of a subsequent block cannot be started until the generation of a local decode image of a block subjected to an immediately preceding coding is completed, i.e. the immediately preceding steps for block coding are all completed. However, on condition that an input image is used to search for a vector, the search for a subsequent vector can be started without waiting for the completion of the steps of immediately preceding block coding. Therefore, it becomes possible to execute the step of searching for a vector, and a subsequent step of coding in parallel, and thus a time allowed for processing of each step is made longer. (On condition that the time involved in the step of searching for a vector is the same as the time involved in the subsequent coding step, for example, the allowed time for processing is doubled by processing the steps in parallel.) If the allowed time for processing becomes longer, even the same processing can be executed with a lower clock frequency, and therefore the power consumption becomes smaller, and the circuit can be made smaller. In addition, using the same clock for execution enables more pixels to be processed within a unit time, and therefore image processing with a higher resolution, image processing with a higher frame rate, parallel processing of more than one image, or a combination thereof can be realized.

Figure 20:
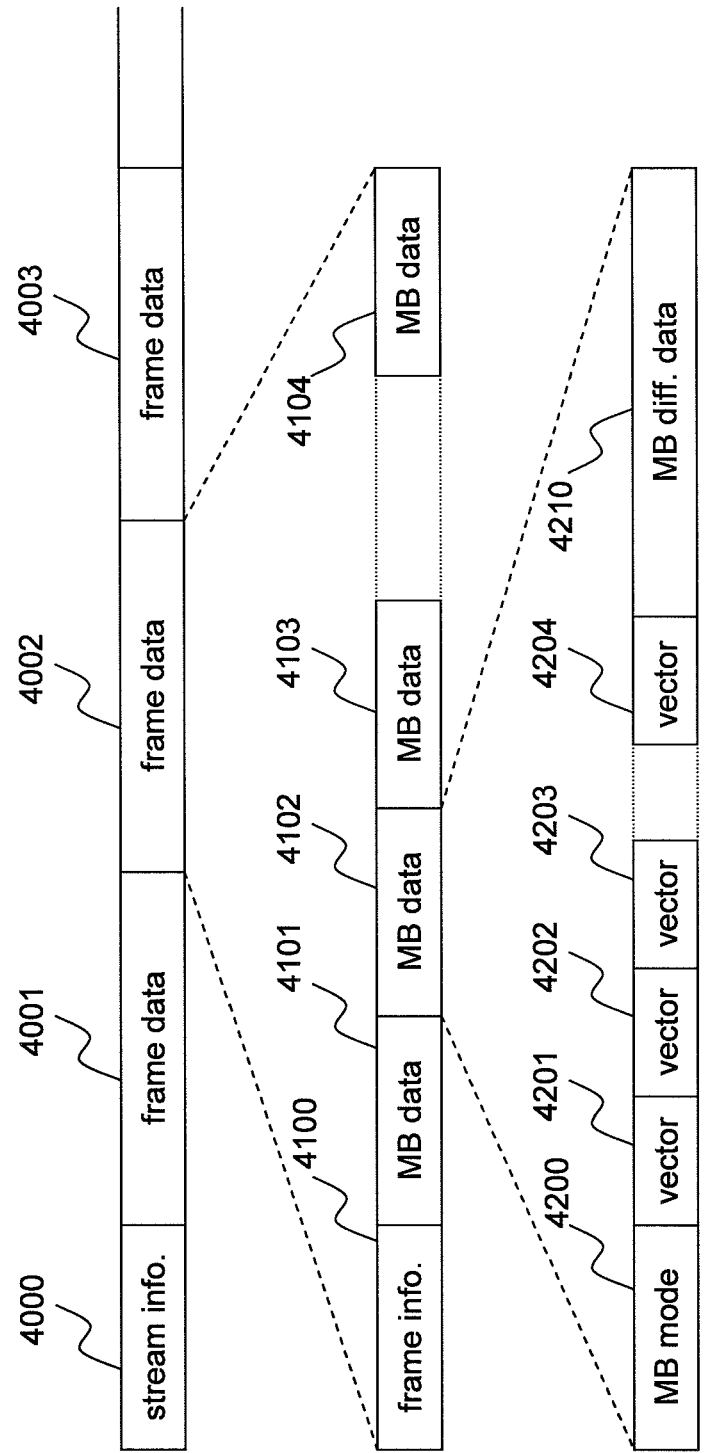
FIG. 20 is a block diagram showing the configuration of a device for reproducing an optical disk to which the invention is applied.

FIG. 20 presents an example of the structure of a data stream 2060 which the coding device 2001 of FIG. 19 creates, which corresponds to the input data stream 1010 of FIG. 7. A data stream is structured hierarchically, in which frame data is placed subsequent to information 4000 relating to the whole stream in the top layer of the hierarchy. Frame data, e.g. the frame data 4002 includes macro block (MB) data 4100-4104 as shown in the middle section of FIG. 20, and has frame information 4100 arranged in its head portion. MB data, e.g. 4102 starts with mode information of the macro block, i.e. MB mode information 4200 as in the bottom section of FIG. 20. In case that the MB mode is a mode of the method shown in the invention, a given number of pieces of vector information for generating prediction signals are arranged (4201-4204). The number of vectors is 16 e.g. in the case of a macro block divided in 16 as in FIG. 15. The number of the division is specified by MB information. Subsequently to the given number of vectors, difference information of the macro block is arranged.

Figure 21:
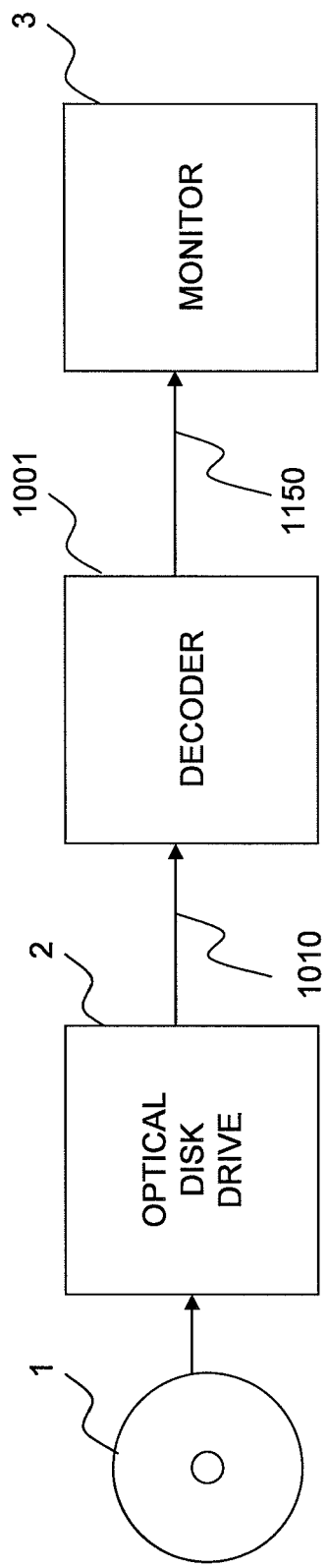
FIG. 21 is a diagram showing a structure of a stream according to the invention.

FIG. 21 is a block diagram of a device for reproducing an optical disk with a visual image recorded therein, which is an example of a device which the invention is applied to. A data stream produced according to the invention is recorded in the optical disk 1. The optical disk drive 2 supplies the decoder 1001 with data stream 1010 of a visual image read out from the optical disk 1. The decoder 1001 outputs, as output signals 1150, visual image information which has been reproduced from an input data stream 1010 according to the foregoing method. The output signals 1150 thus output are reproduced by the monitor 3.

While the invention made by the inventor has been concretely described on the embodiment above, the invention is not limited to the embodiment. It is obvious that various changes may be made without departing from the subject matter thereof.

The invention also includes modifications below or a combination thereof applied to the already described embodiments and modifications thereof.

As to the embodiments, the applications of the invention to the intra-frame coding have been shown. However, the embodiments are also applicable to coding and decoding, which involve both of inter-frame coding and intra-frame coding.

Further, the embodiments are also applicable to a block of an intra-frame coding mode in inter-frame coding. Specifically, in the course of inter-frame coding, in case that the intra-picture vector prediction according to the invention rather than prediction according to the motion-compensated inter-frame prediction is judged to be suitable for a certain block (or macro block), the information that intra-picture vector prediction is selected is added to a data stream, and then prediction signals are produced using pixels of an already coded area in the same picture, according to the method shown in the embodiment of the invention, followed by steps of conversion and coding of the difference signal thereof. In this way, the block coding with a smaller amount of codes can be performed in comparison to the case of conducting a typical intra-frame coding on the block of interest. In this case, the coding method which has been described in the portion hereof associated with FIG. 15 can be applied if there is not a prediction vector of a neighboring block in creation of prediction signals of a vector.

Also, in decoding, the information that the intra-picture vector prediction is selected is extracted from a data stream and judged, and thereafter the block of interest can be subjected to decoding as in the embodiments. At this time, it is shown by the MB mode 4200 of FIG. 20 that the block of interest has been coded according to the intra-picture vector prediction.

The invention can be applied to not only the coding of a moving image, but also the coding of a still picture.

While the description of the embodiments of the invention has been presented assuming a progressive image, the embodiments can be applied to an interlace signal. In such case, "image" represents a frame image or field image in the embodiments.

In coding or decoding in frame images, the invention may be combined with the frame/field adaptive coding, by which a frame mode and a field mode are switched for each block (macro block) and then the block is processed. In the case of switching and using a frame vector (a vector indicating a block of frame unit)/field vector (a vector indicating a block of field unit) as the intra-picture vector of the invention, the embodiments can be applied can be applied as they are. The signal for switching between the frame vector and the field vector may be applied for each block (sub-block), or one switching signal may be specified for all of macro blocks. Further, the switching signal may be associated with coding mode information of a macro block.

In regard to a frame image with interlace signals, a picture is formed by laying out one-filed images different in time for each line. Therefore, in case that any motion arises in a picture, an edge portion or the like in the picture is alternately put out of position from line to line while following a comb shape in the picture. According to the invention, such periodic pattern can be predicted efficiently, and therefore a higher coding efficiency is achieved in comparison to a conventional method which is not arranged to handle a periodic pattern.

The above-described embodiments is based on the assumption that a prediction block is used as a prediction signal as it is, however the invention also includes the following cases.

(1) A signal of a prediction block multiplied by a coefficient is made a prediction signal. This is for coping with the change in brightness in a picture. As a result, the efficiency of prediction is never decreased even in a situation where a periodically patterned image is gradually becoming dark because of lightning, for example. By applying this processing to a prediction pixel of an overlap, a higher prediction efficiency can be achieved.

(2) The processing for enlargement or contraction is performed on a signal of a prediction block, and the resultant signal is made a prediction signal. The size of the prediction block must be changed according to the multiplying factor of enlargement/contraction. (In the case of performing enlargement to double, the size of the prediction block may be a half of the normal size.) The enlargement and contraction of a prediction block achieve a higher coding efficiency when e.g. the width (line width) of an object in an image is changing. Further, even if the processing is performed on a larger block, it is possible to cope with the conversion of an image. Therefore, the efficiency of coding never decreases, the overhead when inversely coding a prediction vector becomes smaller, and thus the efficiency of coding increases.

(3) A signal of a prediction block is forced to revolve, and made a prediction signal. The revolution may be a revolution by an arbitrary angle, or revolution with a limited angle. The processing of revolution is made easier by, for example, limiting the angle to 90, 180 or 270 degrees in comparison to the revolution with an arbitrary angle. Further, the amount of codes of information showing the number of degrees of the revolution also becomes smaller. The revolution of a prediction block is useful for coding an image having a combination of vertically and horizontally complicated patterns, and an image involving an object with indeterminate forms facing various directions like small leaves of a tree.

INDUSTRIAL APPLICABILITY

The invention can be widely applied to coding and decoding techniques for moving pictures and still pictures.

What is claimed is:

1. An image processing device comprising:
a decoder receiving intra-frame prediction direction from an encoder using directional intra-frame prediction decoding,
wherein, on condition that a prediction block, generated by vector information extracted from a data stream provided by the encoder, and a decode-target block have an overlap region, the overlap region containing pixels of the prediction block and pixels of the decode-target block, the decoder uses as a prediction signal pixel information of an already-decoded portion located at a distance from the overlap region, the distance being that of an integer multiple of a size of a first vector, the first vector indicating a relative position from a pixel of the decode-target block to a corresponding pixel of the prediction block and being provided by the vector information, and adds the prediction signal to difference image data taken from the data stream to generate reproduction image data of the decode-target block,
wherein the prediction block, the decode-target block, and the overlap region are located in the same image frame, and the prediction block is used by the decoder to predict the decode-target block, and
wherein the pixel information of said already-decoded portion is used as replacement of the pixel information of the overlap portion of the prediction block as part of the prediction signal.

2. An intra-frame decoding method for directional prediction in which intra-frame prediction direction is supplied by an encoder, for a condition that a prediction block indicated by vector information extracted from a data stream provided by the encoder and a decode-target block have an overlap region, the overlap region containing pixels of the prediction block and pixels of the decode-target block, the method comprising:
the step of using, as a prediction signal, pixel information of an already-decoded portion located at a distance from the overlap region, the distance being that of
an integer multiple of a size of a first vector, the first vector indicating a relative position from a pixel of the decode-target block to a corresponding pixel of the prediction block and being provided by the vector information; and
the step of adding the prediction signal to difference image data taken from the data stream to generate reproduction image data of the decode-target block,
wherein the prediction block, the decode-target block, and the overlap region are located in the same image frame, and the prediction block is used by the decoder to predict the decode-target block, and
wherein the pixel information of said already-decoded portion is used as replacement of the pixel information of the overlap portion of the prediction block as part of the prediction signal.

3. An intra-frame decoder for directional prediction in which intra-frame prediction direction is supplied by an encoder, comprising:
an extracting module operable to extract vector information from a data stream provided by the encoder, wherein the vector information provides a first vector which indicates a relative position from a pixel of a not-yet-decoded area to a corresponding pixel of a prediction block;

a judging module operable to judge whether the pixel position indicated by the vector information is located in an already-decoded area or the not-yet-decoded area;

a pixel-position-calculating module operable to calculate a further pixel position for each pixel position judged to be located in the not-yet-decoded area, wherein the further pixel position is located in the already-decoded area and at a distance from the pixel position located in the not-yet-decoded area, the distance being that of an integer multiple of a size of the first vector provided by the vector information;

a prediction-signal-generating module operable to generate prediction image data for pixels of the prediction block based on pixel data of the further pixel positions calculated by the pixel-position-calculating module, and the pixel data of the pixel positions judged to be located in the already-decoded area; and an image-reproducing module operable to add difference image data taken from the data stream to the prediction image data to create reproduction image data, wherein the prediction block and the not-yet decoded area and the already-decoded area are located in the same image frame, and the prediction block is used by the decoder to predict the not-yet-decoded area, and wherein the further pixel information of said already-decoded area is used as replacement of the pixel information of the pixel positions of the prediction block judged to be located in the not-yet-decoded area by the judging module as part of the prediction image data.

4. The intra-frame decoder according to claim 3, further comprising:

a multiplier module operable to multiply, by an integer, the vector provided by the vector information, wherein the pixel-position-calculating module uses a vector resulting from the multiplication to calculate a pixel position of pixel data of an already-decoded area.

5. The intra-frame decoder according to claim 3, wherein the prediction-signal- generating module generates prediction image data for each pixel of the prediction block having a pixel position judged to be located in the not-yet-decoded area by interpolating pixel data of pixels surrounding the further pixel position calculated by the pixel-position-calculating module.

6. The intra-frame decoder according to claim 3, wherein the pixel-position-calculating module calculates the further pixel position within a given range.

7. The intra-frame decoder according to claim 6, wherein the given range is set based on a signal extracted from the data stream.

8. The intra-frame image decoder according to claim 3, wherein the data stream is a data stream of a still or moving picture.

9. An intra-frame decoding method for directional prediction in which intra-frame prediction direction is supplied by an encoder, comprising:

an extracting step of extracting vector information from a data stream provided by the encoder, wherein the vector information provides a first vector which indicates a relative position from a pixel of a not-yet-decoded area to a corresponding pixel of a prediction block;

a judging step of judging whether the pixel position indicated by the vector information is located in an already-decoded area or the not-yet-decoded area;

a pixel-position-calculating step of calculating a further pixel position for each pixel position judged to be located in the not-yet-decoded area, wherein the further pixel position is located in the already-decoded area and at a distance from the pixel position judged to be located in the not-yet-decoded area, the distance being that of an integer multiple of a size of the first vector provided by the vector information;

a prediction-signal-generating step of generating prediction image data for pixels of the prediction block, based on pixel data of the further pixel positions calculated by the pixel-position-calculating step, and the pixel data of the pixel positions judged to be located in the already-decoded area; and an image-reproducing step of adding difference image data taken from the data stream to the prediction image data to create reproduction image data, wherein the prediction block and the not-yet decoded area and the already-decoded area are located in the same image frame, and the prediction block is used by the decoder to predict the not-yet-decoded area, and wherein the further pixel information of said already-decoded area is used as replacement of the pixel information of the pixel positions of the prediction block judged to be located in the not-yet-decoded area by the judging module as part of the prediction image data.

10. An intra-frame decoding method for directional prediction, wherein intra-frame prediction direction is supplied by an encoder, comprising:

a first step of extracting vector information from a data stream provided by the encoder, wherein the vector information provides a first vector which indicates a relative position from a pixel of a not-yet-decoded area to a corresponding pixel of a prediction block;

a second step of judging whether the pixel position indicated by the vector information is located in an already-decoded area or the not-yet-decoded area;

a third step of computing an integer multiple of a size of the first vector provided by the vector information;

a fourth step of calculating a further pixel position for each pixel position judged to be located in the not-yet-decoded area, wherein the further pixel position is located in the already-decoded area and at a distance from the pixel position judged to be located in the not-yet-decoded area, the distance being that of the integer multiple of the size of the first vector;

a fifth step of creating prediction image data for pixels of the prediction block based on pixel data of the further pixel positions calculated by the fourth step, and pixel data of the pixel positions judged to be located in the already-decoded area in the second step; and a sixth step of adding difference image data taken from the data stream to the prediction image data to create reproduction image data, wherein the prediction block and the not-yet decoded area and the already-decoded area are located in the same image frame, and the prediction block is used by the decoder to predict the not-yet-decoded area, and wherein the further pixel information of said already-decoded area is used as replacement of the pixel information of the pixel positions of the prediction block judged to be located in the not-yet-decoded area by the judging module as part of the prediction image data.

11. An image coding device which divides image data into a plurality of blocks, selects a block similar to a block to be coded from an already-coded area within the same frame to make a prediction signal, encodes vector information from a data stream provided by an encoder showing a relative position of a block similar to the block to be coded, generates a prediction signal and a difference signal between a block similar to the block to be coded and the prediction signal, the device comprising, as a local intra-frame decoder configured for directional prediction, the decoder receiving intra-frame prediction direction from the encoder:
- a judging module operable to judge whether the pixel position indicated by the vector information is located in an already-decoded area or a not-yet-decoded area;
- a pixel-position-calculating module operable to calculate a further pixel position for each pixel position judged to be located in the not-yet-decoded area, wherein the further pixel position is located in the already-decoded area and at a distance from the pixel position judged to be located in the not-yet-decoded area, the distance being that of an integer multiple of a size of a first vector, the first vector indicating a relative position from a pixel of a not-yet-decoded area to a corresponding pixel of a prediction block and being provided by the vector information; and
- a prediction-signal-generating module operable to generate prediction image data for pixels of the prediction block based on pixel data of the further pixel positions calculated by the pixel-position-calculating module, and the pixel data of the pixel positions judged to be located in the already-decoded area,
- wherein the prediction block and the not-yet decoded area and the already-decoded area are located in the same image frame, and the prediction block is used by the decoder to predict the not-yet-decoded area, and
- wherein the further pixel information of said already-decoded area is used as replacement of the pixel information of the pixel positions of the prediction block judged to be located in the not-yet-decoded area by the judging module as part of the prediction image data.

12. An inter-frame decoder for directional prediction which involves both of a block subjected to an inter-frame coding and a block subjected to an intra-frame coding, the intra-frame decoder being configured to receive intra-frame prediction direction from an encoder, comprising:
- an extracting module operable to extract vector information from a data stream provided by the encoder in case that a block created according to the data stream is judged to be of an intra-frame mode, wherein the vector information provides a first vector which indicates a relative position from a pixel of a not-yet-decoded area to a corresponding pixel of a prediction block;
- a judging module operable to judge whether the pixel position indicated by the vector information is located in an already-decoded area or the not-yet-decoded area;
- a pixel-position-calculating module operable to calculate a further pixel position for each pixel position judged to be located in the not-yet-decoded area, wherein the further pixel position is located in the already-decoded area and at a distance from the pixel located in the not-yet-decoded area, the distance being that of an integer multiple of a size of the first vector provided by the vector information;
- a prediction-signal-generating module operable to generate prediction image data for pixels of the prediction block based on pixel data of the further pixel positions calculated by the pixel-position-calculating module, and the pixel data of the pixel positions judged to be located in the already-decoded area; and
- an image-reproducing module operable to add a difference image data taken from the data stream to the prediction image data to create reproduction image data,
- wherein the prediction block and the not-yet decoded area and the already-decoded area are located in the same image frame, and the prediction block is used by the decoder to predict the not-yet-decoded area and
- wherein the further pixel information of said already-decoded area is used as replacement of the pixel information of the pixel positions of the prediction block judged to be located in the not-yet-decoded area by the judging module as part of the prediction image data.

13. An intra-frame decoder for directional prediction, wherein the decoder is configured to receive intra-frame prediction direction from an encoder, comprising:
- an extracting module operable to extract vector information from a data stream provided by the encoder, wherein the vector information provides a first vector which indicates a relative position from a pixel of a not-yet-decoded area to a corresponding pixel of a prediction block;
- a judging module operable to judge whether the pixel position indicated by the vector information is located in an already-decoded area or a not-yet-decoded area;
- a pixel-position-calculating module operable to calculate a further pixel position for each pixel position judged to be located in the not-yet-decoded area, wherein the further pixel position is located in the already-decoded area and at a distance from the pixel position judged to be located in the not-yet-decoded area, the distance being that of an integer multiple of a size of the first vector provided by the vector information;
- a prediction-signal-generating module operable to generate prediction image data for pixels of the prediction block based on pixel data of the further pixel positions calculated by the pixel-position-calculating module, and the pixel data of the pixel positions judged to be located in the already-decoded area;
- a prediction-signal-converting module operable to convert the prediction image data generated by the prediction-signal-generating module according to a method shown by the data stream; and
- an image-reproducing module operable to add difference image data taken from a stream to the prediction image data resulting from the conversion by the prediction-signal- converting module to generate reproduction image data,
- wherein the prediction block and the not-yet decoded area and the already-decoded area are located in the same image frame, and the prediction block is used by the decoder to predict the not-yet-decoded area, and
- wherein the further pixel information of said already-decoded area is used as replacement of the pixel information of the pixel positions of the prediction block judged to be located in the not-yet-decoded area by the judging module as part of the prediction image data.

* * * * *